US012639527B2

(12) United States Patent
Sahoo et al.

(10) Patent No.: US 12,639,527 B2
(45) Date of Patent: May 26, 2026

(54) MACHINE LEARNING BASED SYSTEMS AND METHODS FOR GENERATING EMAILS

(71) Applicant: HIGHRADIUS CORPORATION, Houston, TX (US)

(72) Inventors: Dibya Prakash Sahoo, Hyderabad (IN); Sumit Gupta, Hyderabad (IN); Lipsa Mishra, Hyderabad (IN); Manish Kumar Choudhary, Hyderabad (IN)

(73) Assignee: HIGHRADIUS CORPORATION, TX (US)

( * ) Notice: Subject to any disclaimer, the term of this patent is extended or adjusted under 35 U.S.C. 154(b) by 207 days.

(21) Appl. No.: 18/398,200

(22) Filed: Dec. 28, 2023

(65) Prior Publication Data

US 2025/0217598 A1      Jul. 3, 2025

(51) Int. Cl.
*G06F 40/40* (2020.01)
*G06F 40/284* (2020.01)
*G06F 40/289* (2020.01)
*G06F 40/35* (2020.01)
*G06N 20/00* (2019.01)

(52) U.S. Cl.
CPC ............ *G06F 40/40* (2020.01); *G06F 40/284* (2020.01); *G06F 40/289* (2020.01); *G06F 40/35* (2020.01); *G06N 20/00* (2019.01)

(58) Field of Classification Search
CPC ...... G06F 40/40; G06F 40/284; G06F 40/289; G06F 40/35
See application file for complete search history.

(56) References Cited

U.S. PATENT DOCUMENTS

| | | | | |
|---|---|---|---|---|
| 11,972,223 B1 * | 4/2024 | DeFoor | ................. | G06N 20/00 |
| 12,067,366 B1 * | 8/2024 | Heller | ..................... | G06F 40/35 |
| 12,111,834 B1 * | 10/2024 | Carbune | .............. | G06F 16/248 |
| 12,142,027 B1 * | 11/2024 | Saraee | .................. | G06N 3/045 |
| 12,204,871 B2 * | 1/2025 | Peleg | .................... | G06F 40/274 |
| 12,368,938 B2 * | 7/2025 | Carbajo | ............ | H04N 21/8549 |
| 2024/0160953 A1 * | 5/2024 | Manda | ..................... | G06N 5/01 |
| 2024/0184812 A1 * | 6/2024 | McDaniel | .............. | G06F 40/35 |
| 2024/0330583 A1 * | 10/2024 | Ryan | .................... | G06V 10/764 |

(Continued)

*Primary Examiner* — Anne L Thomas-Homescu

(74) *Attorney, Agent, or Firm* — Jason C. Cameron

(57) ABSTRACT

A machine learning based computing method for generating electronic mails for accounts receivables management is disclosed. The machine learning based computing method includes steps of: receiving inputs from first electronic devices of first users; extracting data associated with second users from databases; retrieving pre-defined electronic mails from electronic mail repositories based on first input associated with the first electronic mails to be generated and second input associated with the second electronic mails to be generated in response to third electronic mails received from second electronic devices of the second users, by a machine learning model; generating augmented prompts for the first electronic mails, and the second electronic mails; generating the first and second electronic mails by the machine learning model, based on the generated augmented prompts; and providing an output of generated first and second electronic mails, to the first users on user interface associated with first electronic devices.

20 Claims, 10 Drawing Sheets

(56)                References Cited

U.S. PATENT DOCUMENTS

| | | | |
|---|---|---|---|
| 2024/0346256 A1* | 10/2024 | Qin | G06F 40/216 |
| 2024/0346566 A1* | 10/2024 | Qin | G06F 40/40 |
| 2024/0378196 A1* | 11/2024 | Lester | G06N 20/00 |
| 2025/0005072 A1* | 1/2025 | Salowitz | G06F 16/438 |
| 2025/0021766 A1* | 1/2025 | Lev | G06F 40/279 |
| 2025/0047622 A1* | 2/2025 | Bodigutla | H04L 51/02 |
| 2025/0077792 A1* | 3/2025 | Chen | G06N 3/045 |
| 2025/0078453 A1* | 3/2025 | Saraee | G06V 10/40 |
| 2025/0078454 A1* | 3/2025 | Saraee | G06V 10/761 |
| 2025/0103642 A1* | 3/2025 | Krishna | G06N 3/0475 |
| 2025/0111091 A1* | 4/2025 | Saligrama Shreeram | G06F 21/629 |
| 2025/0123724 A1* | 4/2025 | Krabach | G06F 3/0481 |
| 2025/0173517 A1* | 5/2025 | Singh | G06F 40/40 |
| 2025/0200086 A1* | 6/2025 | Malboubi | G06F 40/40 |

* cited by examiner

100

104

Memory 202

Plurality of Modules 110

Retraining
Subsystem 222

Data
Extraction
Subsystem
212

Electronic
Mail
Retrieval
Subsystem
214

Augmented
Prompts
Generation
Subsystem 216

Electronic
Mail
Generation
Subsystem
218

User Interface
with Data
Receiving
Subsystem 210
and Output
Subsystem 220

Machine Learning
Model 112

System Bus 208

Storage Unit 206

Hardware Processor(s) 204

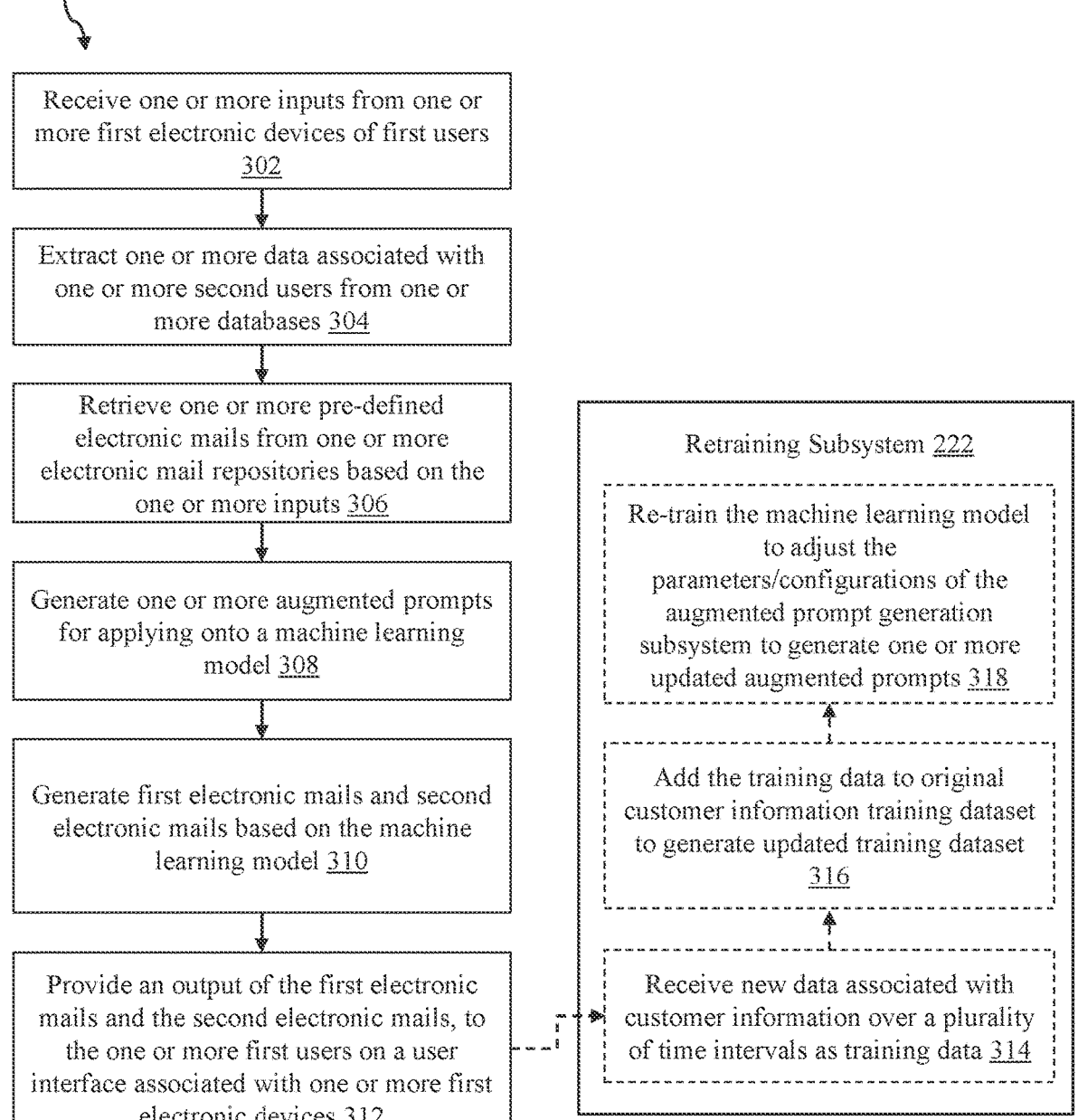

300

Receive one or more inputs from one or more first electronic devices of first users
302

Extract one or more data associated with one or more second users from one or more databases 304

Retrieve one or more pre-defined electronic mails from one or more electronic mail repositories based on the one or more inputs 306

Generate one or more augmented prompts for applying onto a machine learning model 308

Generate first electronic mails and second electronic mails based on the machine learning model 310

Provide an output of the first electronic mails and the second electronic mails, to the one or more first users on a user interface associated with one or more first electronic devices 312

Retraining Subsystem 222

Re-train the machine learning model to adjust the parameters/configurations of the augmented prompt generation subsystem to generate one or more updated augmented prompts 318

Add the training data to original customer information training dataset to generate updated training dataset 316

Receive new data associated with customer information over a plurality of time intervals as training data 314

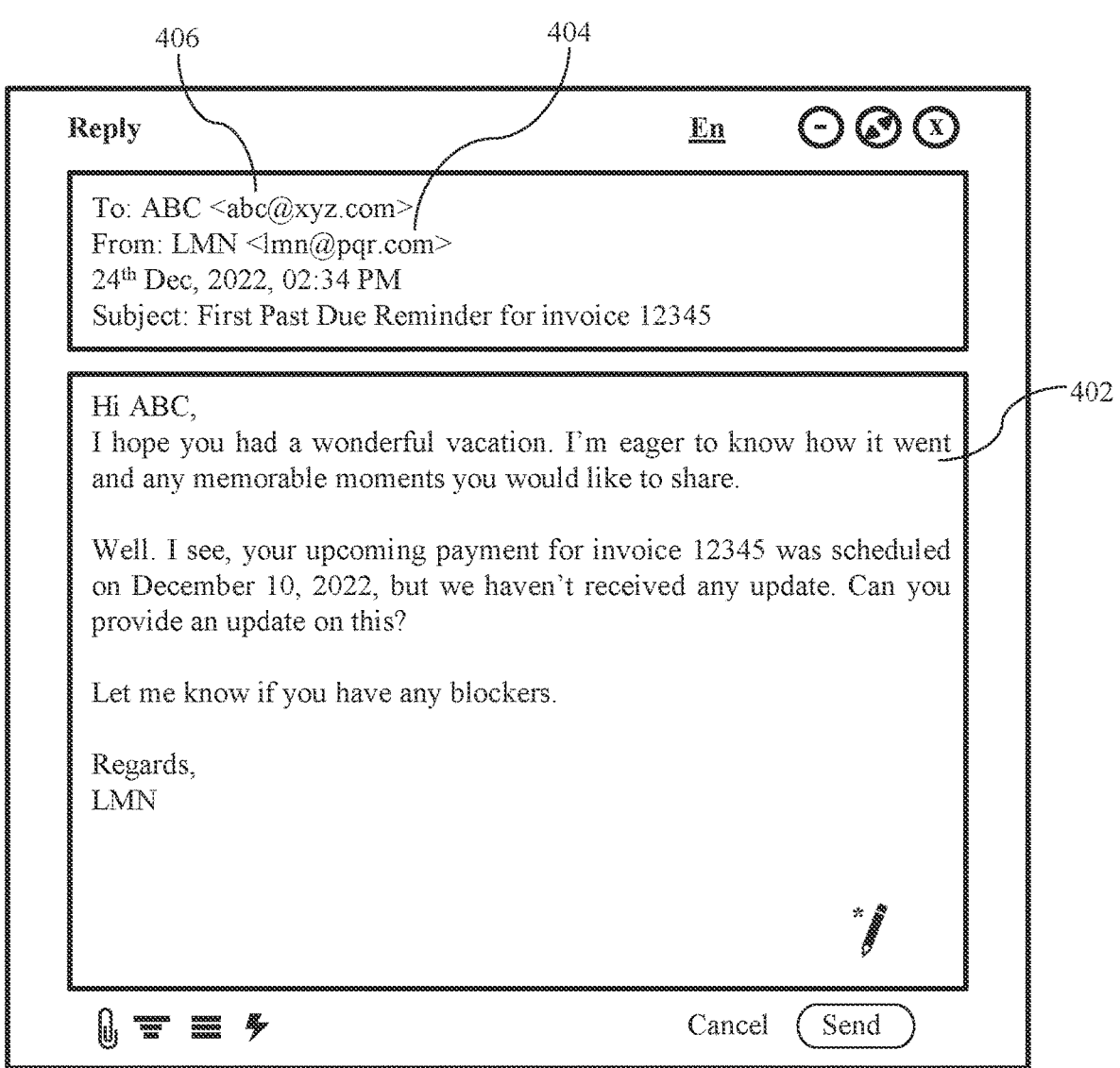

Reply                                                En    ⊖ ⊘ ⊗

To: ABC <abc@xyz.com>
From: LMN <lmn@pqr.com>
24ᵗʰ Dec, 2022, 02:34 PM
Subject: First Past Due Reminder for invoice 12345

Hi ABC,
I hope you had a wonderful vacation. I'm eager to know how it went
and any memorable moments you would like to share.

Well. I see, your upcoming payment for invoice 12345 was scheduled
on December 10, 2022, but we haven't received any update. Can you
provide an update on this?

Let me know if you have any blockers.

Regards,
LMN

Cancel    ( Send )

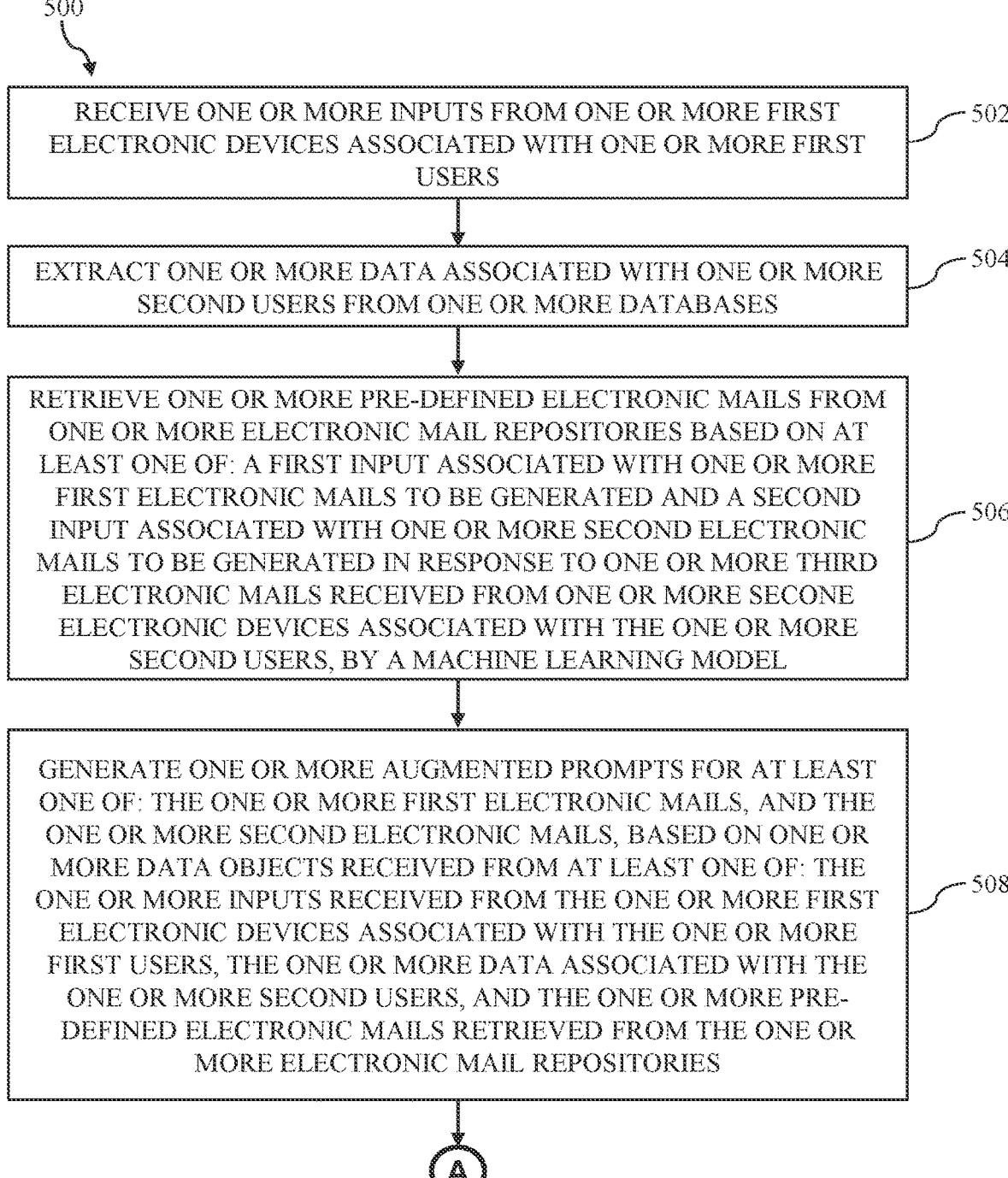

500

RECEIVE ONE OR MORE INPUTS FROM ONE OR MORE FIRST ELECTRONIC DEVICES ASSOCIATED WITH ONE OR MORE FIRST USERS — 502

EXTRACT ONE OR MORE DATA ASSOCIATED WITH ONE OR MORE SECOND USERS FROM ONE OR MORE DATABASES — 504

RETRIEVE ONE OR MORE PRE-DEFINED ELECTRONIC MAILS FROM ONE OR MORE ELECTRONIC MAIL REPOSITORIES BASED ON AT LEAST ONE OF: A FIRST INPUT ASSOCIATED WITH ONE OR MORE FIRST ELECTRONIC MAILS TO BE GENERATED AND A SECOND INPUT ASSOCIATED WITH ONE OR MORE SECOND ELECTRONIC MAILS TO BE GENERATED IN RESPONSE TO ONE OR MORE THIRD ELECTRONIC MAILS RECEIVED FROM ONE OR MORE SECONE ELECTRONIC DEVICES ASSOCIATED WITH THE ONE OR MORE SECOND USERS, BY A MACHINE LEARNING MODEL — 506

GENERATE ONE OR MORE AUGMENTED PROMPTS FOR AT LEAST ONE OF: THE ONE OR MORE FIRST ELECTRONIC MAILS, AND THE ONE OR MORE SECOND ELECTRONIC MAILS, BASED ON ONE OR MORE DATA OBJECTS RECEIVED FROM AT LEAST ONE OF: THE ONE OR MORE INPUTS RECEIVED FROM THE ONE OR MORE FIRST ELECTRONIC DEVICES ASSOCIATED WITH THE ONE OR MORE FIRST USERS, THE ONE OR MORE DATA ASSOCIATED WITH THE ONE OR MORE SECOND USERS, AND THE ONE OR MORE PRE-DEFINED ELECTRONIC MAILS RETRIEVED FROM THE ONE OR MORE ELECTRONIC MAIL REPOSITORIES — 508

GENERATE AT LEAST ONE OF: THE ONE OR MORE FIRST ELECTRONIC MAILS AND THE ONE OR MORE SECOND ELECTRONIC MAILS BY THE MACHINE LEARNING MODEL BASED ON THE GENERATED ONE OR MORE AUGMENTED PROMPTS     510

PROVIDE AN OUTPUT OF AT LEAST ONE OF: THE GENERATED ONE OR MORE FIRST ELECTRONIC MAILS AND THE GENERATED ONE OR MORE SECOND ELECTRONIC MAILS, TO THE ONE OR MORE FIRST USERS ON A USER INTERFACE ASSOCIATED WITH THE ONE OR MORE FIRST ELECTRONIC DEVICES     512

FIG. 5
(Contd.,)

MACHINE LEARNING BASED SYSTEMS AND METHODS FOR GENERATING EMAILS

FIELD OF INVENTION

Embodiments of the present disclosure relate to machine learning based (ML-based) computing systems, and more particularly relates to a ML-based computing method and system for generating one or more electronic mails.

BACKGROUND

Accounts receivable management aims at ensuring that customers fulfil their payment obligations promptly for the goods and services they have obtained from a business. This practice aids in sustaining a robust cash flow, mitigating bad debts, and enhancing customer relations for the business.

Among the diverse approaches employed by accounts receivables executives to reach out to customers, electronic mails (emails) persist as the most prevalent method. This prevalence is attributed to the ubiquity of electronic mail as a communication medium. Additionally, electronic mail communication stands out for its cost-effectiveness compared to alternatives including at least one of: phone calls, physical mail, and the like. The minimal costs associated with sending electronic mails are particularly advantageous in large-scale debt collection practices encompassing numerous customers. Moreover, the electronic mail communication establishes a digital paper trail, serving as documented evidence of debt collection endeavours. This documentation holds significance for legal purposes and dispute resolutions, offering a transparent audit trail of communication history.

However, there exists a significant challenge that pertains to efficient handling of a substantial volume of customer electronic mails, requiring responses within a constrained window of 48 to 72 hours. This challenge is especially relevant to collection analysts or personnels working in accounts receivables management entrusted with the responsibilities of understanding, composing, and promptly sending responses to a multitude of emails each day.

Furthermore, the above said process becomes notably time-intensive when customers seek at least one of: invoices, account summaries, and other relevant documents. In addition to these requests, the collection analysts must balance this responsibility with other critical tasks, including at least one of: client follow-ups, monitoring incoming payments, and the like.

Hence, there is a need for an improved machine learning based (ML-based) computing system and method for generating one or more electronic mails, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a machine-learning based (ML-based) computing method for generating one or more electronic mails, is disclosed. The ML-based computing method comprises receiving, by one or more hardware processors, one or more inputs from one or more first electronic devices associated with one or more first users. In an embodiment, the one or more inputs comprise at least one of: a first input to generate one or more first electronic mails for one or more second users, a second input to generate one or more second electronic mails in response to one or more third electronic mails received from one or more second electronic devices associated with the one or more second users, a third input to generate one or more augmented prompts for at least one of: the one or more first electronic mails and the one or more second electronic mails, and a fourth input to generate one or more messages with at least one of: the one or more first electronic mails and the one or more second electronic mails. In a non-limiting embodiment, the one or more augmented prompts comprise at least one of: a text comprising word, phrase, and sentence, which enhances the input for a large language model (LLM) by retrieving relevant information from an user input or external source, including one or more databases and combining the relevant information with an original augmented prompt. This way, the large language model may generate more accurate and informative responses that are not limited by its training data.

The ML-based computing method further comprises extracting, by the one or more hardware processors, one or more data associated with the one or more second users from one or more databases.

The ML-based computing method further comprises retrieving, by the one or more hardware processors, one or more pre-defined electronic mails from one or more electronic mail repositories based on at least one of: the first input associated with the one or more first electronic mails to be generated and the second input associated with the one or more second electronic mails to be generated in response to the one or more third electronic mails received from the one or more second electronic devices associated with the one or more second users, by a machine learning model.

The ML-based computing method further comprises generating, by the one or more hardware processors, the one or more augmented prompts for at least one of: the one or more first electronic mails, and the one or more second electronic mails, based on one or more data objects received from at least one of: the one or more inputs received from the one or more first electronic devices associated with the one or more first users, the one or more data associated with the one or more second users, and the one or more pre-defined electronic mails retrieved from the one or more electronic mail repositories.

The ML-based computing method further comprises generating, by the one or more hardware processors, at least one of: the one or more first electronic mails and the one or more second electronic mails by the machine learning model, based on the generated one or more augmented prompts.

The ML-based computing method further comprises providing, by the one or more hardware processors, an output of at least one of: the generated one or more first electronic mails and the generated one or more second electronic mails, to the one or more first users on a user interface associated with the one or more first electronic devices.

In an embodiment, the one or more first users comprise at least one of: one or more data analysts, one or more business analysts, one or more cash analysts, one or more financial analysts, one or more collection analysts, one or more debt collectors, and one or more professionals associated with cash and collection management. The one or more second users comprise at least one of: one or more individual customers, one or more organizations, one or more parent companies, one or more subsidiaries, one or more joint ventures, one or more partnerships, and one or more legal entities.

In another embodiment, extracting, by the one or more hardware processors, the one or more data associated with the one or more second users from the one or more databases, comprises (a) retrieving, by the one or more hardware processors, one or more documents corresponding to at least one of: the one or more first electronic mails and the one or more second electronic mails, from the one or more databases; and (b) retrieving, by the one or more hardware processors, one or more parameters from the one or more databases for generating the one or more augmented prompts.

The one or more parameters comprise at least one of: whether one or more electronic mail queries are unresolved, an acknowledgment status of the one or more electronic mails sent to the one or more second users, one or more upcoming payment reminders, one or more upcoming auto correspondences, bouncing of a last sent electronic mail and a pending action associated with the bounced last sent electronic mail, one or more contexts of unread electronic mail from the one or more second users, read and unread of the one or more electronic mails, one or more open invoices, one or more actions taken on respective invoices, credit information, one or more unapplied payments, one or more upcoming calls with the one or more second users, a last note by the one or more first users, and invoice notes.

In yet another embodiment, the one or more electronic mail repositories comprise at least one of the one or more first electronic mails sent by the one or more first users and the one or more second electronic mails generated in response to the one or more third electronic mails received from the one or more second electronic devices associated with the one or more second users. In an embodiment, retrieving, by the machine learning model, the one or more pre-defined electronic mails from the one or more electronic mail repositories, comprises: (a) assigning, by the one or more hardware processors, one or more embedding scores to one or more embedding vectors comprising one or more texts in the one or more pre-defined electronic mails; (b) receiving, by the one or more hardware processors, at least one of: the first input associated with the one or more first electronic mails to be generated and the second input associated with the one or more second electronic mails to be generated in response to the one or more third electronic mails received from the one or more second electronic devices associated with the one or more second users; (c) mapping, by the one or more hardware processors, the first input associated with the one or more first electronic mails to be generated and the second input associated with the one or more second electronic mails to be generated in response to the one or more third electronic mails received from the one or more second electronic devices associated with the one or more second users, on the one or more texts in the one or more pre-defined electronic mails; (d) generating, by the one or more hardware processors, the one or more embedding scores for the one or more texts in the one or more pre-defined electronic mails based on the mapping of at least one of: the first input associated with the one or more first electronic mails to be generated and the second input associated with the one or more second electronic mails to be generated in response to the one or more third electronic mails received from the one or more second electronic devices associated with the one or more second users, on the one or more texts in the one or more pre-defined electronic mails; and (e) retrieving, by the one or more hardware processors, the one or more pre-defined electronic mails with one or more optimum embedding scores, from the one or more electronic mail repositories. The one or more embedding scores are configured to compute relatedness between at least two or more texts in the one or more pre-defined electronic mails.

In yet another embodiment, retrieving, by the machine learning model, the one or more pre-defined electronic mails from the one or more electronic mail repositories, further comprises: (a) determining, by the one or more hardware processors, whether the one or more texts are longer than a predetermined length of a token set by the machine learning model; (b) segmenting, by the one or more hardware processors, the one or more texts into one or more chunks within the predetermined length of the token; (c) receiving, by the one or more hardware processors, the one or more chunks at the machine learning model to generate the one or more embedding scores for the one or more chunks; (d) generating, by the one or more hardware processors, one or more sequences of the one or more embedding vectors associated with the one or more texts when one or more sentences are embedded. The one or more texts are split based on at least one of: paragraph boundaries and sentence boundaries to maintain meaning of the one or more texts.

In yet another embodiment, generating, by the one or more hardware processors, the one or more augmented prompts for at least one of the one or more first electronic mails, and the one or more second electronic mails, comprises: (a) retrieving, by the one or more hardware processors, one or more intent categories of the one or more electronic mails comprising at least one of: the one or more first electronic mails and the one or more second electronic mails based on information associated with one or more contexts of the one or more augmented prompts; (b) providing, by the one or more hardware processors, one or more information associated with the one or more intent categories of the one or more electronic mails, to the machine learning model; and (c) generating, by the one or more hardware processors, the one or more augmented prompts for at least one of the one or more first electronic mails, and the one or more second electronic mails, by analyzing the one or more intent categories of the one or more electronic mails comprising at least one of: the one or more first electronic mails and the one or more second electronic mails.

In yet another embodiment, the machine learning based (ML-based) computing method further comprises re-training, by the one or more hardware processors, the machine learning model over a plurality of time intervals. In an embodiment, re-training the machine learning model over the plurality of time intervals, comprises: (a) receiving, by the one or more hardware processors, the one or more training data associated with the one or more second users, from an output subsystem; (b) adding, by the one or more hardware processors, the one or more training data with one or more original training datasets to generate one or more updated training datasets; (c) re-training, by the one or more hardware processors, the machine learning model, to adjust one or more configurations of an augmented prompt generation subsystem; and (d) executing, by the one or more hardware processors, the re-trained machine learning model in the augmented prompt generation subsystem to generate one or more updated augmented prompts.

In yet another embodiment, the machine learning model is configured on one or more servers for generating at least one of: the one or more first electronic mails and the one or more second electronic mails, based on the generated one or more augmented prompts.

In one aspect, a machine learning based (ML-based) computing system for generating one or more electronic mails, is disclosed. The ML-based computing system includes one or more hardware processors and a memory coupled to the one or more hardware processors. The memory includes a plurality of subsystems in the form of programmable instructions executable by the one or more hardware processors.

The plurality of subsystems comprises a data receiving subsystem configured to receive one or more inputs from one or more first electronic devices associated with one or more first users. The one or more inputs comprise at least one of: a first input to generate one or more first electronic mails for one or more second users, a second input to generate one or more second electronic mails in response to one or more third electronic mails received from one or more second electronic devices associated with the one or more second users, a third input to generate one or more augmented prompts for at least one of: the one or more first electronic mails and the one or more second electronic mails, and a fourth input to generate one or more messages with at least one of: the one or more first electronic mails and the one or more second electronic mails.

The plurality of subsystems further comprises a data extraction subsystem configured to extract one or more data associated with the one or more second users from one or more databases.

The plurality of subsystems further comprises an electronic mail retrieval subsystem configured to retrieve one or more pre-defined electronic mails from one or more electronic mail repositories based on at least one of: the first input associated with the one or more first electronic mails to be generated and the second input associated with the one or more second electronic mails to be generated in response to the one or more third electronic mails received from the one or more second electronic devices associated with the one or more second users, by a machine learning model.

The plurality of subsystems further comprises an augmented prompt generation subsystem configured to generate the one or more augmented prompts for at least one of: the one or more first electronic mails, and the one or more second electronic mails, based on one or more data objects received from at least one of: the one or more inputs received from the one or more first electronic devices associated with the one or more first users, the one or more data associated with the one or more second users, and the one or more pre-defined electronic mails retrieved from the one or more electronic mail repositories.

The plurality of subsystems further comprises an electronic mail generation subsystem configured to generate at least one of: the one or more first electronic mails and the one or more second electronic mails by the machine learning model based on the generated one or more augmented prompts.

The plurality of subsystems further comprises an output subsystem configured to provide an output of at least one of: the generated one or more first electronic mails and the generated one or more second electronic mails, to the one or more first users on a user interface associated with the one or more first electronic devices.

In another aspect, a non-transitory computer-readable storage medium having instructions stored therein that, when executed by a hardware processor, causes the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIG. 3 is an overall process flow of generating the one or more electronic mails, in accordance with another embodiment of the present disclosure;

FIG. 4A-4E are exemplary user interface representations of an output of the ML-based computing system for generating the one or more electronic mails, in accordance with an embodiment of the present disclosure; and FIG. 5 is a flow chart illustrating a machine-learning based (ML-based) computing method for generating the one or more electronic mails, in accordance with an embodiment of the present disclosure;

Figure 1:
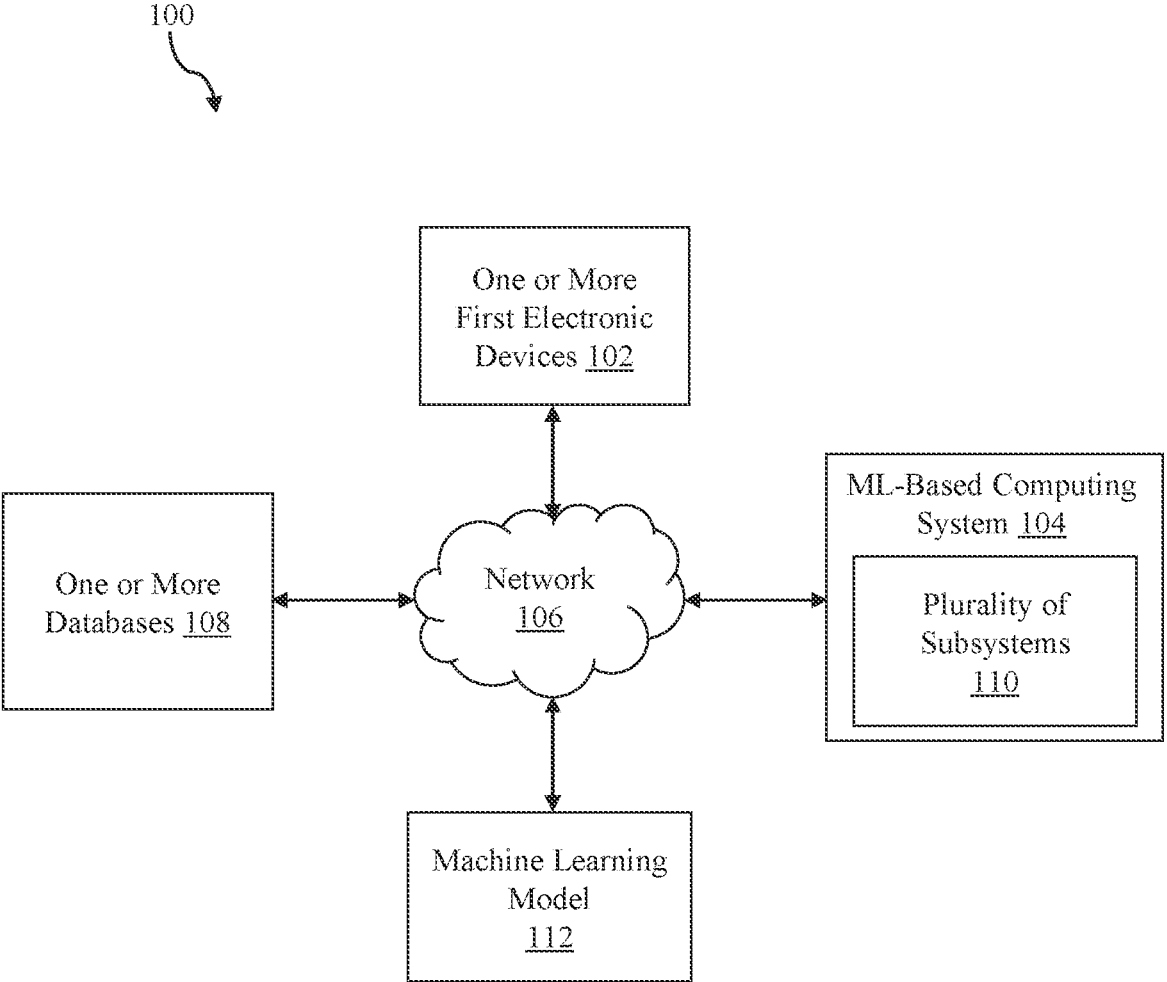
FIG. 1 is a block diagram illustrating a computing environment with a machine learning based (ML-based) computing system for generating one or more electronic mails and segmenting the one or more electronic mails based on the intent, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed, permanently configured (hardwired) or temporarily configured (programmed) to operate in a certain manner and/or to perform certain operations described herein.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 is a block diagram illustrating a computing environment 100 with a machine learning based (ML-based) computing system 104 for generating one or more electronic mails (Emails), in accordance with an embodiment of the present disclosure. According to FIG. 1, the computing environment 100 includes one or more first electronic devices 102 that are communicatively coupled to the ML-based computing system 104 through a network 106. The one or more first electronic devices 102 through which one or more first users provide one or more inputs to the ML-based computing system 104.

In an embodiment, the one or more first users may include at least one of: one or more data analysts, one or more business analysts, one or more cash analysts, one or more financial analysts, one or more collection analysts, one or more debt collectors, one or more professionals associated with cash and collection management, and the like.

The present invention is configured to provide an output of one or more first electronic mails and the one or more second electronic mails to the one or more first users. The ML-based computing system 104 is initially configured to receive one or more inputs from the one or more first electronic devices 102 associated with the one or more first users. In an embodiment, the one or more inputs include at least one of: a first input to generate the one or more first electronic mails for one or more second users, a second input to generate the one or more second electronic mails in response to one or more third electronic mails received from one or more second electronic devices associated with the one or more second users, a third input to generate one or more augmented prompts (e.g., tones, intent categories and the like) for at least one of: the one or more first electronic mails and the one or more second electronic mails, and a fourth input to generate one or more messages (e.g., one or more personalized messages) with at least one of: the one or more first electronic mails and the one or more second electronic mails. In a non-limiting embodiment, the one or more augmented prompts may include at least one of: a text comprising word, phrase, and sentence indicating tone, intent category and the like, which enhances the input for a large language model (LLM) by retrieving relevant information from an user input or external source, including one or more databases and combining the relevant information with an original augmented prompt. This way, the large language model may generate more accurate and informative responses that are not limited by its training data.

The ML-based computing system 104 is further configured to extract one or more data associated with the one or more second users from one or more databases 108. In an embodiment, the one or more second users include at least one of: one or more individual customers, one or more organizations, one or more parent companies, one or more subsidiaries, one or more joint ventures, one or more partnerships, and one or more legal entities. In some embodiments, the one or more second users owes at least one of: a financial obligation, liability, debt, and the like.

The ML-based computing system 104 is further configured to retrieve one or more pre-defined electronic mails from one or more electronic mail repositories based on at least one of: the first input associated with the one or more first electronic mails to be generated and the second input associated with the one or more second electronic mails to be generated in response to the one or more third electronic mails received from the one or more second electronic devices associated with the one or more second users, by a machine learning model. In an embodiment, the machine learning model may be the large language model 112. The ML-based computing system 104 is further configured to generate the one or more augmented prompts for at least one of: the one or more first electronic mails, and the one or more second electronic mails, based on one or more data objects received from at least one of: the one or more inputs received from the one or more first electronic devices 102 associated with the one or more first users, the one or more data associated with the one or more second users, and the one or more pre-defined electronic mails retrieved from the one or more electronic mail repositories.

The ML-based computing system 104 is further configured to generate at least one of: the one or more first electronic mails and the one or more second electronic mails by the machine learning model, based on the generated one or more augmented prompts. The ML-based computing system 104 is further configured to provide an output of at least one of: the generated one or more first electronic mails and the generated one or more second electronic mails, to the one or more first users on a user interface associated with the one or more first electronic devices 102.

The ML-based computing system 104 may be hosted on a central server including at least one of: a cloud server or a remote server. Further, the network 106 may be at least one of: a Wireless-Fidelity (Wi-Fi) connection, a hotspot connection, a Bluetooth connection, a local area network (LAN), a wide area network (WAN), any other wireless network, and the like. In an embodiment, the one or more electronic devices 102 may include at least one of: a laptop computer, a desktop computer, a tablet computer, a Smartphone, a wearable device, a Smart watch, and the like.

Further, the computing environment 100 includes the one or more databases 108 communicatively coupled to the ML-based computing system 104 through the network 106. In an embodiment, the one or more databases 108 includes at least one of: one or more relational databases, one or more object-oriented databases, one or more data warehouses, one or more cloud-based databases, and the like. In another embodiment, a format of the one or more data associated with the one or more second users retrieved from the one or more databases 108 may include at least one of: a comma-separated values (CSV) format, a JavaScript Object Notation (JSON) format, an Extensible Markup Language (XML), spreadsheets, and the like. In another embodiment, the one or more data associated with the one or more second users can be accessed through web application programming interfaces (APIs), predominantly provided in JSON or XML formats.

Furthermore, the one or more electronic devices 102 include at least one of: a local browser, a mobile application, and the like. Furthermore, the one or more second users may use a web application through the local browser or the mobile application to communicate with the ML-based computing system 104. In certain embodiments, the ML-based computing system 104 is communicatively connected to the one or more large language models 112 hosted on an external cloud server. In certain instances, a plurality of subsystems 110 are configured to communicate with the large language model 112 using application programming interfaces (APIs). In another embodiment, the ML-based computing system 104 is communicatively connected to the one or more large language models 112 hosted on at least one of: one or more on-premise servers, one or more private cloud servers, and the like.

In an embodiment of the present disclosure, the ML-based computing system 104 includes the plurality of subsystems 110. Details on the plurality of subsystems 110 have been elaborated in subsequent paragraphs of the present description with reference to FIG. 2.

Figure 2:
FIG. 2 is a detailed view of the ML-based computing system for generating the one or more electronic mails, in accordance with another embodiment of the present disclosure.

FIG. 2 is a detailed view of the ML-based computing system 104 for generating the one or more electronic mails, in accordance with another embodiment of the present disclosure. The ML-based computing system 104 includes a memory 202, one or more hardware processors 204, and a storage unit 206. The memory 202, the one or more hardware processors 204, and the storage unit 206 are communicatively coupled through a system bus 208 or any similar mechanism. The memory 202 includes the plurality of subsystems 110 in the form of programmable instructions executable by the one or more hardware processors 204.

The plurality of subsystems 110 includes a data receiving subsystem 210, a data extraction subsystem 212, an electronic mail retrieval subsystem 214, an augmented prompts generation subsystem 216, an electronic mail generation subsystem 218, an output subsystem 220, and a retraining subsystem 222. The brief details of the plurality of subsystems 110 have been elaborated in a below table.

| Plurality of Subsystems 110 | Functionality |
| --- | --- |
| Data receiving subsystem 210 | The data receiving subsystem 210 is configured to receive the one or more inputs from the one or more first electronic devices 102 associated with the one or more first users. |
| Data extraction subsystem 212 | The data extraction subsystem 212 is configured to extract the one or more data associated with the one or more second users from the one or more databases 108. |
| Electronic mail retrieval subsystem 214 | The electronic mail retrieval subsystem 214 is configured to retrieve the one or more pre-defined electronic mails from the one or more electronic mail repositories based on at least one of: the first input associated with the one or more first electronic mails to be generated and the second input associated with the one or more second electronic mails to be generated in response to the one or more third electronic mails received from the one or more second electronic devices associated with the one or more second users, by the machine learning model (large language model 112). |
| Augmented prompts generation subsystem 216 | The augmented prompts generation subsystem 216 is configured to generate the one or more augmented prompts for at least one of: the one or more first electronic mails, and the one or more second electronic mails, based on one or more data objects received from at least one of: the one or more inputs received from the one or more first electronic devices 102 associated with the one or more first users, the one or more data associated with the one or more second users, and the one or more pre-defined electronic mails retrieved from the one or more electronic mail repositories. |
| Electronic mail generation subsystem 218 | The electronic mail generation subsystem 218 is configured to generate at least one of: the one or more first electronic mails and the one or more second electronic mails by the machine learning model based on the generated one or more augmented prompts. |
| Output Subsystem 220 | The output subsystem 220 is configured to provide the output of at least one of: the generated one or more first electronic mails and the generated one or more second electronic mails, to the one or more first users on a user interface associated with |

-continued

| Plurality of Subsystems 110 | Functionality |
|---|---|
| | the one or more first electronic devices 102. |
| Retraining Subsystem 222 | The retraining subsystem 222 is configured to re-train the machine learning model over a plurality of time intervals with one or more training data. |

The one or more hardware processors 204, as used herein, means any type of computational circuit, including, but not limited to, at least one of: a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 204 may also include embedded controllers, including at least one of: generic or programmable logic devices or arrays, application specific integrated circuits, single-chip computers, and the like.

The memory 202 may be non-transitory volatile memory and non-volatile memory. The memory 202 may be coupled for communication with the one or more hardware processors 204, being a computer-readable storage medium. The one or more hardware processors 204 may execute machine-readable instructions and/or source code stored in the memory 202. A variety of machine-readable instructions may be stored in and accessed from the memory 202. The memory 202 may include any suitable elements for storing data and machine-readable instructions, including at least one of: read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202 includes the plurality of subsystems 110 stored in the form of machine-readable instructions on any of the above-mentioned storage media and may be in communication with and executed by the one or more hardware processors 204.

The storage unit 206 may be a cloud storage, a Structured Query Language (SQL) data store, a noSQL database or a location on a file system directly accessible by the plurality of subsystems 110.

The plurality of subsystems 110 includes the data receiving subsystem 210 that is communicatively connected to the one or more hardware processors 204. The data receiving subsystem 210 is configured to receive the one or more inputs from the one or more first electronic devices 102 associated with the one or more first users through the user interface of the one or more first electronic devices 102. In an embodiment, the one or more inputs include information related to at least one of the first input to generate the one or more first electronic mails for the one or more second users, the second input to generate the one or more second electronic mails in response to the one or more third electronic mails received from the one or more second electronic devices associated with the one or more second users, the third input to generate the one or more augmented prompts (e.g., the tones, intent categories and the like) for at least one of: the one or more first electronic mails and the one or more second electronic mails, and the fourth input to generate the one or more messages (e.g., the one or more personalized messages) with at least one of: the one or more first electronic mails and the one or more second electronic mails.

In an embodiment, the one or more first users may include at least one of: one or more data analysts, one or more business analysts, one or more cash analysts, one or more financial analysts, one or more collection analysts, one or more debt collectors, and one or more professionals associated with cash and collection management. In an embodiment, the one or more second users may include at least one of: the one or more individual customers, the one or more organizations, the one or more parent companies, one or more subsidiaries, one or more joint ventures, one or more partnerships, and one or more legal entities. In some embodiments, the one or more second users owes at least one of: a financial obligation, liability, debt, and the like.

In an embodiment, the data receiving subsystem 210 is configured to allow the one or more first users to generate a new electronic mail (e.g., the one or more first electronic mails) and to respond with an electronic mail (e.g., the one or more second electronic mails) to a customer electronic mail (e.g., the one or more third electronic mails) through a graphical user interface. The graphical user interface includes one or more visual or graphic elements including at least one of: one or more icons and interactive elements for generating the new electronic mail or responding electronic mails to the customer electronic mails.

In an embodiment, for generating the new electronic mail or generating the response to the customer electronic mail, the one or more first users may specify one or more tones for the electronic mail tailored to specific communication scenarios. The one or more tones for the one or more electronic mails are configured to enhance effectiveness of the electronic mail correspondence based on a relationship with the one or more second users and intended purpose of the one or more electronic mails.

In an exemplary embodiment, the data receiving subsystem 210 is configured to allow the one or more first users to specify/input a "Friendly" augmented prompt (e.g., tone), which is characterized by its casual and informal nature. This augmented prompt is ideally suited for communication with at least one of: close coworkers or friends, fostering a comfortable and amicable atmosphere conducive to building and maintaining strong relationships. In another exemplary embodiment, the data receiving subsystem 210 is configured to allow the one or more first users to input a "Professional" augmented prompt, which is formal and respectful in its approach for interactions with clients or managers. This augmented prompt serves to convey a sense of competence and expertise, thereby enhancing professionalism in electronic mail exchanges.

In yet another exemplary embodiment, the data receiving subsystem 210 is configured to allow the one or more first users to input an "Escalation" augmented prompt, which is strategically configured for addressing ongoing issues that require immediate attention. This augmented prompt embodies assertiveness and directness, while always maintaining a professional and respectful demeanour, ensuring that problems are effectively resolved. In yet another exemplary embodiment, the data receiving subsystem 210 is configured to allow the one or more first users to input a "Strict" augmented prompt, intended for situations where adherence to established rules or policies is paramount. This augmented prompt is firm and authoritative, providing clear and concise instructions, thereby facilitating compliance with regulations and guidelines.

In certain embodiments, the data receiving subsystem 210 is configured to allow the one or more first users to input the one or more personalized messages to be included in the one or more electronic mails to be generated. In an exemplary embodiment, the data receiving subsystem 210 is configured to allow the one or more first users to input the "friendly" augmented prompts and input the personalized message as "He was on vacation last week. Ask him about his vacation" when one or more first users provide the one or more inputs for generating new electronic mails or generating responses to customer electronic mails.

In another exemplary embodiment, the data receiving subsystem 210 is configured to allow the one or more first users to input the "friendly" augmented prompts and input the personalized message as "His birthday is coming up next week. Include an advance birthday wish" when one or more first users provide the one or more inputs for generating new electronic mails or generating responses to customer electronic mails. In an embodiment, the one or more inputs received from the one or more first users are used for retrieving the one or more data associated with one or more second users, Further, the one or more inputs received from the one or more first users are also used by the ML-based computing system 104 and method for generating the one or more augmented prompts and the one or more electronic mails.

The plurality of subsystems 110 further includes the data text extraction subsystem 212 that is communicatively connected to the one or more hardware processors 204. The data extraction subsystem 212 is configured to extract the one or more data associated with the one or more second users from the one or more databases 108. In other words, the data extraction subsystem 212 is configured to retrieve/extract one or more customer information required for the augmented prompts generation and the electronic mail generation. In an embodiment, the one or more data associated with the one or more second users include at least one of: one or more customer names, one or more customer identifiers, one or more account statuses of the one or more customers, a past communication history with the one or more customers, the one or more electronic mails and correspondences, behavior (e.g., on time payer, late payer) of the one or more customers, future payment forecasts, and the like.

In certain embodiments, past incoming or outgoing electronic mails may include information including at least one of: one or more invoice document numbers, one or more due dates, one or more committed dates, one or more payment dates, one or more amounts, one or more dispute reasons, one or more follow-up reasons, one or more purchase order numbers, one or more sales numbers, one or more remittance numbers, one or more remittance amounts and other data points. In an embodiment, the one or more account statuses of the one or more customers indicate whether the account is active, suspended, or in arrears. In another embodiment, the past communication history with the one or more customers includes details of all interactions and exchanges between the one or more customers and one or more businesses, including the one or more electronic mails, one or more phone calls, and the like.

In yet another embodiment, the one or more electronic mails and correspondences may include at least one of: one or more electronic mail correspondences and written communications between the one or more businesses and the one or more customers. In yet another embodiment, the behavior of the one or more customers indicates how punctual the one or more customers are with their payments. The behavior of the one or more customers distinguishes between the one or more customers who consistently make on-time payments and those who occasionally pay late. In yet another embodiment, the future payment forecast is a predictive analysis of the one or more customers likely payment behavior based on historical data and trends. In certain non-limiting embodiments, the future payment forecast can be computed using systems and methods disclosed in U.S. patent application Ser. No. 18/474,423, and U.S. patent application Ser. No. 18/474,429, and similar algorithms including at least one of: time-series models, prophet models.

In an embodiment, in extracting the one or more data associated with the one or more second users from the one or more databases 108, the data extraction subsystem 212 is configured to retrieve one or more documents corresponding to at least one of: the one or more first electronic mails and the one or more second electronic mails, from the one or more databases 108. As a non-limiting example, if the one or more first users request the generation of a new electronic mail (e.g., the one or more first electronic mails) for sending one or more pending invoices to the one or more second users (e.g., the one or more customers), the data extraction subsystem 212 is configured to search the one or more databases 108 and retrieve the one or more pending invoices for the one or more customers. The one or more documents can be sent to the output subsystem 220 as an attachment to the one or more electronic mails (e.g., the one or more first electronic mails and the one or more second electronic mails) generated.

As another non-limiting example, if the one or more first users requests the generation of a response electronic mail (e.g., the one or more second electronic mails) to a request by the one or more customers for sending the one or more remittance documents, the data extraction subsystem 212 is configured to search the one or more databases 108 and retrieve the one or more relevant remittance documents pertaining to the one or more customers. The one or more documents can be sent to the output subsystem 220 as an attachment to the one or more electronic mails generated. In another embodiment, the data extraction subsystem 212 is configured to receive the intent of an email. In a non-limiting example, the intent of an electronic mail can be generated by ML-based computing systems and methods disclosed in U.S. patent application Ser. No. 18/398,189

In certain embodiments, the intent of the electronic mail may be at least one of: procure to pay (P2P), Dispute, Follow Up, account statement request, invoice request, payment confirmation, query and miscellaneous. In an embodiment, the procure-to-pay (P2P) electronic mail intent signifies a process of at least one of: requisitioning, purchasing, receiving, paying for and accounting for goods and services in an ordered sequence of procurement, and financial processes, starting with the first steps of procuring a good or service to the final steps involved in paying for the good or service. As a non-limiting example, the one or more electronic mails in the procure-to-pay (P2P) intent category involve payment-related inquiries or issues. The one or more electronic mails in the procure-to-pay (P2P) may include at least one of:

requests for payment instructions, payment delays, questions about a payment process, and the like.

In another embodiment, the dispute electronic mail intent signifies invoice and billing statement discrepancies that arise when a client decides that the client should not be responsible to pay an invoice. As a non-limiting example, the dispute-related electronic mail may be when a client reports a perceived inaccuracy in a billing document or the client is unsatisfied with a service and raises a dispute. As another non-limiting example, the one or more electronic mails categorized in the disputes intent category often involve disagreements or discrepancies between the invoice and what the client/customer believes the customer owes. The one or more electronic mails may include at least one of: complaints, claims of overbilling, requests for resolution, and the like.

In yet another embodiment, the follow-up electronic mail intent category signifies a process of customers contacting an accounts receivable department to inquire about their invoice or payment status. The follow-up electronic mail intent may include at least one of: questions about the amount owed, payment due date, payment methods, and the like. Conversely, the follow-up electronic mail further signifies the process of the one or more users contacting the customers who have not paid their invoices on time to remind them of their outstanding balance and request payment. The follow-up electronic mails are typically reminders or status updates related to outstanding invoices. The follow-up electronic mails may include at least one of: gentle reminders for pending payments, updates on payment plans, and the like.

In yet another embodiment, the account statement request electronic mail intent signifies a request of account statements by the customers, which provide an overview of all transactions and outstanding balances. The customers may ask for the account statements to reconcile their records. In yet another embodiment, the invoice request intent signifies the one or more electronic mails from the customers or clients who need copies of specific invoices or billing details. The customer/clients may have lost the original invoice or require additional documentation for their records.

In yet another embodiment, the payment confirmation intent signifies the one or more electronic mails that confirm that a payment has been received. These one or more electronic mails often serve as receipts and can help both the one or more users and the customers keep track of successful transactions. In yet another embodiment, the query electronic mail intent signifies the one or more electronic mails sent by the customers to the accounts receivable department to inquire about their invoice or payment status. These one or more electronic mails may include at least one of: questions about the amount owed, payment due date, payment methods, and the like. In yet another embodiment, the miscellaneous electronic mail intent encompasses a wide range of inquiries that don't fit into the other categories. The miscellaneous electronic mail intent category may include questions about account balances, account setup, general account-related inquiries, and the like.

In an embodiment, in extracting the one or more data associated with the one or more second users from the one or more databases 108, the data extraction subsystem 212 is further configured to retrieve one or more parameters from the one or more databases 108 for generating the one or more augmented prompts (one or more augmented prompts). In an embodiment, the one or more parameters may include at least one of: whether one or more electronic mail queries are unresolved, an acknowledgement status of the one or more electronic mails sent to the one or more second users, one or more upcoming payment reminders, one or more upcoming auto correspondences, bouncing of a last sent electronic mail and a pending action associated with the bounced last sent electronic mail, one or more contexts of unread electronic mail from the one or more second users, read and unread of the one or more electronic mails, one or more open invoices, one or more actions taken on respective invoices, credit information, one or more unapplied payments, one or more upcoming calls with the one or more second users, a last note by the one or more first users, and invoice notes.

In certain non-limiting embodiments, the data extraction subsystem 212 is configured to access and extract the one or more data related to the one or more second users for subsequent processing in one or more data formats. In another embodiment, the format of the one or more data associated with the one or more second users retrieved from the one or more databases 108 may include at least one of: a comma-separated values (CSV) format, a JavaScript Object Notation (JSON) format, an Extensible Markup Language (XML), spreadsheets, and the like. In another embodiment, the one or more data associated with the one or more second users can be accessed through the web application programming interfaces (APIs), predominantly provided in JSON or XML formats.

The plurality of subsystems 110 further includes the electronic mail retrieval subsystem 214 that is communicatively connected to the one or more hardware processors 204. The electronic mail retrieval subsystem 214 is configured to retrieve the one or more pre-defined electronic mails from the one or more electronic mail repositories based on at least one of: the first input associated with the one or more first electronic mails to be generated and the second input associated with the one or more second electronic mails to be generated in response to the one or more third electronic mails received from the one or more second electronic devices associated with the one or more second users, by the machine learning model. In other words, the electronic mail retrieval subsystem 214 is configured to retrieve the one or more electronic mails which are similar to the one which will be generated. In an embodiment, the electronic mail retrieval subsystem 214 is configured to access the one or more electronic mail repositories.

In an embodiment, the one or more electronic mail repositories may include the one or more electronic mails pertaining to the one or more second users. The one or more electronic mail include at least one of: the one or more first electronic mails sent by the one or more first users and the one or more second electronic mails generated in response to the one or more third electronic mails received from the one or more second electronic devices associated with the one or more second users. In an embodiment, the one or more electronic mail repositories include one or more embedding scores for each electronic mail using a word embedding model.

In an embodiment, in retrieving the one or more pre-defined electronic mails from the one or more electronic mail repositories, the electronic mail retrieval subsystem 214 is configured to assign one or more embedding scores to one or more embedding vectors including one or more texts in the one or more pre-defined electronic mails. In an embodiment, the one or more embedding scores are one or more numeric values assigned to the one or more embedding vectors including the one or more texts that represents how similar the text is to another text. In another embodiment, the one or more embedding scores are configured to compute relatedness between at least two or more texts in the one or more pre-defined electronic mails.

In an embodiment, the one or more embedding scores are computed by taking at least one of: a dot product, and a cosine similarity function between the two or more embedding vectors. In an embodiment, highest embedding scores may indicate more semantic similarity between the two or more embedding vectors, while lower embedding scores may indicate more dissimilarity between the two or more embedding vectors. The one or more embedding scores are relative and depend on embedding space. The one or more embedding scores closer to the value 1 indicate high similarity between the two or more embedding vectors when there is no fixed range for the one or more embedding scores. In an embodiment, the one or more embedding scores are useful for finding at least one of: semantically related words, phrases, and documents based on their embedding vector representations.

In an embodiment, the one or more embedding scores for each electronic mail in the one or more repositories is computed using a function in the large language model 112 including the get_embedding ( ) function in the text-embedding-ada-002 large language model. In another embodiment, the large language model 112 may include at least one of: a generative pre-trained transformer (GPT) model, a generative pre-trained transformer 3 (GPT-3) model, a generative pre-trained transformer 3.5 (GPT-3.5) model, a generative pre-trained transformer 4 (GPT-4) model, a Claude model, a bidirectional encoder representations from transformers (BERT) model, a robustly optimized BERT-pretraining approach (RoBERTa) model, a large language model meta AI (LLaMA) model, Gemini models and the like.

In an embodiment, there are two scenarios in which the electronic mail retrieval subsystem 214 is configured to receive the one or more pre-defined electronic mails. The two scenarios include the generation of the new electronic mail (e.g., the one or more first electronic mails) by the one or more first users, and the generation of the replied electronic mail (e.g., the one or more second electronic mails) to the electronic mail (e.g., the one or more third electronic mails) received from the one or more second electronic devices associated with the one or more second users.

The electronic mail retrieval subsystem 214 is configured to receive at least one of: the first input associated with the one or more first electronic mails to be generated as the new electronic mail and the second input associated with the one or more second electronic mails to be generated in response to the one or more third electronic mails received from the one or more second electronic devices associated with the one or more second users. The electronic mail retrieval subsystem 214 is further configured to map the first input associated with the one or more first electronic mails to be generated and the second input associated with the one or more second electronic mails to be generated in response to the one or more third electronic mails received from the one or more second electronic devices associated with the one or more second users, on the one or more texts in the one or more pre-defined electronic mails.

The electronic mail retrieval subsystem 214 is further configured to generate the one or more embedding scores for the one or more texts in the one or more pre-defined electronic mails based on the mapping of at least one of: the first input associated with the one or more first electronic mails to be generated and the second input associated with the one or more second electronic mails to be generated in response to the one or more third electronic mails received from the one or more second electronic devices associated with the one or more second users, on the one or more texts in the one or more pre-defined electronic mails. In other words, the electronic mail retrieval subsystem 214 is configured to generate the one or more embedding scores for the one or more pre-defined reference electronic mails, and then to search the one or more electronic mail repositories for the one or more texts with the closest embedding score (e.g., optimum embedding score) based on the cosine similarity function. The one or more text with the optimum embedding score is retrieved for further processing.

Further, the electronic mail retrieval subsystem 214 is configured to determine whether the one or more texts are longer than a predetermined length of a token set by the machine learning model. The electronic mail retrieval subsystem 214 is further configured to segment/split the one or more texts into one or more chunks within the predetermined length of the token. In an embodiment, the one or more texts are split based on at least one of: paragraph boundaries and sentence boundaries to maintain meaning of the one or more texts. Subsequently, the one or more chunks are passed into the machine learning model to generate the one or more embedding scores for the one or more chunks. The electronic mail retrieval subsystem 214 is further configured to generate one or more sequences of the one or more embedding vectors associated with the one or more texts when one or more sentences are embedded. In an embodiment, to perform the comparison, the electronic mail retrieval subsystem 214 is further configured to compute the cosine similarity function between the one or more sequences of embedding vectors from a first electronic mail and the one or more sequences of embedding vectors from a second electronic mail.

In an embodiment, a more granular comparison is performed by comparing individual sentence chunks from each electronic mail based on their respective embedding vectors. For each sentence chunk in the first electronic mail, the corresponding sentence chunk in the second electronic mail is compared using their associated embedding vectors. In yet another embodiment, to aggregate the similarities across all sentence chunks, one or more aggregation methods can be employed, including computing the average or maximum similarity score among all sentence pairs. This aggregated similarity score provides a comprehensive view of the semantic similarity between the two electronic mails, considering one or more contents of all sentence chunks collectively.

The plurality of subsystems 110 further includes the augmented prompts generation subsystem 216 that is communicatively connected to the one or more hardware processors 204. The augmented prompts generation subsystem 216 is configured to generate the one or more augmented prompts which are passed/applied onto the large language model 112 for generating the new electronic mail (e.g., the one or more first electronic mails), and the replied electronic mail (e.g., the one or more second electronic mails) response to the customer electronic mail (e.g., the one or more third electronic mails). In an embodiment, the augmented prompts generation subsystem 216 is a parameter driven component with one or more pre-defined rules for generating the one or more augmented prompt/responses. In certain embodiments, the augmented prompts generation subsystem 216 includes one or more prompt engineering rules to create structured prompts covering a wide range of scenarios for generating the one or more first electronic mails and the one or more second electronic mails.

In one embodiment, the augmented prompts generation subsystem 216 is configured to retrieve the one or more data objects from the data receiving subsystem 210, the data extraction subsystem 212 and the electronic mail retrieval subsystem 214, to generate a structured augmented prompt. In other words, the augmented prompts generation subsystem 216 is configured to generate the one or more augmented prompts for at least one of: the one or more first electronic mails, and the one or more second electronic mails, based on one or more data objects received from at least one of: the one or more inputs received from the one or more first electronic devices 102 associated with the one or more first users, the one or more data associated with the one or more second users, and the one or more pre-defined electronic mails retrieved from the one or more electronic mail repositories.

In certain embodiments, the one or more augmented prompts comprise one or more context and at least one data retrieved from at least one of: the data receiving subsystem 210, the data extraction subsystem 212 and the electronic mail retrieval subsystem 214. In one embodiment, the augmented prompts generation subsystem 216 includes one or more rules which define the one or more context for the prompt generation. The one or more context of a prompt refers to the information that sets the objectives of the electronic mail or a query, and provides relevant information to the large language model 112. The one or more context help the large language model 112 to understand the intent of the prompt and generate more relevant and accurate responses. In another embodiment, the augmented prompts generation subsystem 216 is configured to retrieve the one or more data objects which enhance the one or more context of the one or more augmented prompts/responses.

In a non-limiting embodiment, the one or more data objects includes at least one: the first input to generate the new electronic mail (e.g., the one or more first electronic mails) for the one or more second users (e.g., the one or more customers), the second input to generate the response (e.g., the one or more second electronic mails) to a customer email (e.g., the one or more third electronic mails), the third input to generate one or more augmented prompts (e.g., the tone, intent categories and the like) of the one or more electronic mails, the fourth input to generate the one or more personalized messages to be included in the one or more electronic mails, the one or more customer names, the one or more customer identifiers, the one or more account statuses of the one or more customers, the past communication history with the one or more customers, the one or more electronic mails and correspondences, the behavior (on time payer, late payer) of the one or more customers, the future payment forecasts, and the like.

In another non-limiting embodiment, the one or more data objects may optionally include an electronic mail which is similar to the one which will be generated. The one or more pre-defined reference emails serve as templates or formats based on which the new electronic mail or the response to the customer electronic mail will be generated. In certain embodiments, the augmented prompts generation subsystem 216 is provided with a specific context. As an example, the augmented prompts generation subsystem 216 includes one or more configured rules which specify that the large language model 112 should act like a collector, and the large language model 112 must not be abusive or aggressive, no data must be presented in the electronic mail apart from the data provided in the prompt/response.

The plurality of subsystems 110 further includes the electronic mail generation subsystem 218 that is communicatively connected to the one or more hardware processors 204. The electronic mail generation subsystem 218 is configured to generate at least one of the one or more first electronic mails and the one or more second electronic mails by the machine learning model based on the generated one or more augmented prompts. In other words, the electronic mail generation subsystem 218 is configured to utilize an output of the augmented prompts generation subsystem 216 for generating one or more texts of the one or more electronic mails using the machine learning model (e.g., the large language model 112).

In one embodiment, the electronic mail generation subsystem 218 is configured to send the one or more augmented prompts/responses to the large language model 112 through an application programming interface (API) or an interface provided by the large language model 112, and requests the generation of the one or more electronic mails. In another embodiment, the electronic mail generation subsystem 218 is communicatively connected to the large language model 112 hosted on one or more on-premise servers controlled by the one or more first users. The one or more augmented prompts are sent to the large language model 112 through a server side application, and requests the generation of the one or more electronic mails. In one embodiment, the large language model 112 generates an email text based on processing of the one or more augmented prompts. In one embodiment, the large language models 112 may include, but are not limited to, GPT models and BERT models.

In one embodiment, the GPT models are generative pre-trained transformer models that use a transformer architecture to learn from large amounts of text data. The GPT models may include four variants including at least one of: Ada, Babbage, Curie, and Davinci, which differ in a number of parameters, the amount of data the GPT models were trained on, and types of tasks the GPT models can perform. In certain embodiments, the GPT models may include, but are not limited to, GPT-3, GPT-3.5, GPT-4, and the like.

In another embodiment, the BERT models are bidirectional encoder representations from transformers models that use the transformer architecture to learn from both left and right context of a given word. The BERT models can be fine-tuned for various natural language understanding tasks, including at least one of: classification, sentiment analysis, question answering, named entity recognition, and the like. As an example, to accommodate the large language models (LLMs) 112 implemented according to embodiments of the present invention, hardware systems may be designed with increased memory capacity, dedicated neural processing units, and optimized data pathways, ensuring seamless model integration and peak performance. Some implementations might involve modular designs allowing for easy swapping of LLMs 112 based on specific tasks or even cloud-based integrations, offering scalability and remote processing capabilities.

In some embodiments, dedicated high-speed Random Access Memory (RAM) and cache memory systems may be integrated to handle the LLMs weight and to support real-time computations. These memory systems would allow for rapid data retrieval and storage operations, critical for on-the-fly model fine-tuning and adaptation. In some implementations, neural processing units (NPUs) may be used. For example, a custom NPU may be designed specifically for neural network computations inherent in LLMs 112, which perform various tasks related to the electronic mail generation subsystem 218 and/or other subsystem. The NPU could ensure accelerated matrix multiplications, tensor operations, and other neural net specific computations, thereby streamlining the LLM's 112 operation. Given the bidirectional nature of models like BERT models, the NPU is optimized to handle parallel processing, enhancing efficiency. High-bandwidth data buses may also be used. For example, data pathways may be designed to facilitate a swift flow of vast amounts of data. These high-bandwidth data buses could ensure that the model can access and process vast chunks of data simultaneously, essential for models like GPT models which handle extensive text data.

In some embodiments, dedicated model storage compartments may be incorporated, which may allow for quick model swapping depending on the task at hand, without overloading the primary memory systems. Various implementations of the present invention provide expandable slots, which may allow for easy upgrades, ensuring that the ML-based computing system 104 remains at a forefront of technological advancements, Some implementations provide a direct cloud integration port that would allow the electronic mail generation subsystem 218 to leverage cloud-based LLMs, offering increased scalability, remote processing, and access to updated models without local hardware upgrades. Some embodiments provide tailored power management systems that are integrated to ensure that the hardware efficiently allocates power based on the demands of the LLM 112, thereby ensuring both energy efficiency and sustained high performance during intensive operations.

The plurality of subsystems 110 further includes the output subsystem 220 that is communicatively connected to the one or more hardware processors 204. The output subsystem 220 is configured to receive the electronic mail text from the large language model 112 through the electronic mail generation subsystem 218 and display the electronic mail text to the one or more first users on the user interface for review before sending the electronic mail text to the one or more second users. In other words, the output subsystem 220 is configured to provide an output of at least one of: the generated one or more first electronic mails and the generated one or more second electronic mails, to the one or more first users on the user interface associated with the one or more first electronic devices 102.

In certain embodiments, the user interface is a compose pane or a message composition window which can be accessed through a webmail service or an electronic mail client. In certain embodiments, the output subsystem 220 is further configured to attach the one or more documents retrieved by the data extraction subsystem 212 that are relevant to the one or more electronic mails automatically. This process saves time and effort for the one or more first users (e.g., the collection analyst), who do not have to search for the one or more documents manually. In certain embodiments, the output subsystem 220 is configured to be user-friendly and easy to use. The one or more first users can easily review the electronic mail text and one or more attached documents and make any necessary changes before sending the one or more electronic mails to the one or more second users. In certain embodiments, the output subsystem 220 is also designed to be secure and confidential. The electronic mail text and the one or more attached documents are only accessible to the one or more first users (e.g., an authorized personnel), ensuring that confidential information is not leaked.

The plurality of subsystems 110 further includes the retraining subsystem 222 that is communicatively connected to the one or more hardware processors 204. The retraining subsystem 222 is configured to re-train the machine learning model over a plurality of time intervals. In an embodiment, in re-training the machine learning model over a plurality of time intervals, the retraining subsystem 222 is configured to receive the one or more training data associated with the one or more second users, from the output subsystem 220. The retraining subsystem 222 is further configured to add the one or more training data with one or more original training datasets to generate one or more updated training datasets. The retraining subsystem 222 is further configured to re-train the machine learning model to adjust one or more configurations of the augmented prompts generation subsystem 216. The retraining subsystem 222 is further configured to execute the re-trained one or more machine learning model in augmented prompts generation subsystem 216 to generate one or more updated augmented prompts.

The retraining subsystem 222 is configured to evaluate and enhance the accuracy of the electronic mail generation processes. In an accuracy assessment process, the retraining subsystem 222 is configured to compare the one or more electronic mails generated with one or more reference data to assess its accuracy. This comparison may utilize techniques including, but not limited to, semantic analysis, similarity metrics, machine learning-based classification, and the like. The retraining subsystem 222 is further configured to generate evaluation reports offering insights into the accuracy of the data extraction. These evaluation reports encapsulate information on error patterns and distributions across one or more document types or data elements, and identify the specific types and sources of errors. To facilitate a thorough understanding of the assessment results, these evaluation reports encompass visualizations, statistical summaries, and a detailed analysis of errors.

In certain embodiments, a feedback generation process is built on the insights from the evaluation reports. The retraining subsystem 222 is further configured to identify one or more patterns or rules contributing to errors and provides actionable recommendations for refinement. This feedback can encompass suggestions for modifying one or more machine learning model parameters for augmented prompt/ response generation. In an embodiment, a feedback incorporation is another process that may be performed by the retraining subsystem 222. This feedback incorporation process facilitates the integration of feedback into the machine learning model and the data extraction pipeline, driving continuous improvement. The interfaces including APIs, or hooks may be used for seamless integration with the data extraction pipeline and facilitate the implementation of feedback. This feedback incorporation process could involve retraining the augmented prompt generation process or modifying other parameters based on the feedback received.

The retraining subsystem 222 is further configured to provide real-time and automated feedback, operating in real-time or at regular intervals to provide ongoing feedback. It integrates with the data extraction pipeline, automatically assessing accuracy, generating reports, and providing feedback without manual intervention. This may be achieved through APIs, event triggers, or workflow integration, ensuring timely and automated feedback incorporation. In some embodiments, the retraining subsystem 222 is retrained after a predetermined amount of time passes (e.g., a week, a month, and the like) using an updated training dataset that additionally includes new context or data for augmented prompt generation.

In some implementations, the retraining subsystem 222 may be implemented using high-performance processing units for evaluating extracted data accuracy against reference or ground truth data, where high-speed CPUs or dedicated neural processing units (NPUs) may be needed.

These processors would handle intense operations including at least one of: exact matching, fuzzy matching, and similarity metrics computations with efficiency, ensuring rapid feedback cycles. The retraining subsystem 222 may additionally be implemented with expanded memory, wherein integrated high-capacity random access memory (RAM), combined with fast sold state drives (SSDs), may be used to support the instantaneous access and storage of vast amounts of data, facilitating comparison tasks including contrasting extracted invoice numbers with stored reference data. Additionally, a dedicated graphics processing Unit (GPU) may be used to satisfy the computational demands of machine learning-based classification and model fine-tuning. In an embodiment, the fine-tuning process aims to optimize the ability of the ML-based computing system 104 to generate contextually relevant and accurate prompts/responses. In another embodiment, machine learning techniques, potentially including neural network training, may be employed to adapt to evolving customer communication patterns.

In some implementations, the retraining subsystem 222 may also be implemented with advanced data storage solutions to serve varied data elements including at least one of: customer details, invoice information, and signature data, scalable storage solutions that are paramount. Fast-access storage solutions like non-volatile memory express (NVMe) SSDs may be incorporated, ensuring quick retrieval of reference datasets, coupled with long-term storage hard disk drives (HDDs) for archived reports and historical datasets.

In some embodiments, the retraining subsystem 222 may be implemented with dedicated interfaces, including at least one of: field programmable gate array (FPGA), application-specific integrated circuits (ASIC) implementations, and the like, that facilitate feedback assimilation into the data extraction pipeline. These dedicated interfaces may offer swift adjustments to model parameters, data preprocessing techniques, or feature selection based on real-time or periodic feedback. To allow the retraining subsystem 222 to operate autonomously at predetermined intervals or in real-time, dedicated workflow controller modules may be embedded. These components, possibly developed as ASICs, may be used to automate tasks including at least one of: model retraining using updated datasets, triggering event-based feedback, and initiating system-wide performance evaluations.

FIG. 3 is an overall process flow 300 of generating the one or more electronic mails, in accordance with another embodiment of the present disclosure. At step 302, the one or more inputs are received from the one or more first electronic devices 102 associated with the one or more first users. In an embodiment, the one or more inputs include at least one of: the first input to generate the one or more first electronic mails for the one or more second users, the second input to generate the one or more second electronic mails in response to the one or more third electronic mails received from the one or more second electronic devices associated with the one or more second users, the third input to generate the one or more augmented prompts for at least one of: the one or more first electronic mails and the one or more second electronic mails, and the fourth input to generate the one or more messages with at least one of the one or more first electronic mails and the one or more second electronic mails.

At step 304, the one or more data associated with the one or more second users are extracted from the one or more databases 108. At step 306, the one or more pre-defined electronic mails are retrieved from the one or more electronic mail repositories based on at least one of: the first input associated with the one or more first electronic mails to be generated and the second input associated with the one or more second electronic mails to be generated in response to the one or more third electronic mails received from the one or more second electronic devices associated with the one or more second users, by the machine learning model. In an embodiment, the machine learning model may be the large language model 112.

At step 308, the one or more augmented prompts are generated for at least one of the one or more first electronic mails, and the one or more second electronic mails, based on the one or more data objects received from at least one of the one or more inputs received from the one or more first electronic devices associated with the one or more first users, the one or more data associated with the one or more second users, and the one or more pre-defined electronic mails retrieved from the one or more electronic mail repositories.

At step 310, at least one of: the one or more first electronic mails and the one or more second electronic mails are generated by the machine learning model, based on the generated one or more augmented prompts. At step 312, the output of at least one of the generated one or more first electronic mails and the generated one or more second electronic mails, are provided to the one or more first users on the user interface associated with the one or more first electronic devices 102.

At step 314, the one or more training data associated with the one or more second users are received from the output subsystem 220 over the plurality of time intervals. At step 316, the one or more training data are combined/added with the one or more original training datasets to generate the one or more updated training datasets. At step 318, the machine learning model is re-trained to adjust one or more configurations of the augmented prompts generation subsystem 216 and the re-trained machine learning model is executed in the augmented prompts generation subsystem 216, to generate the one or more updated augmented prompts.

Figure 4A:
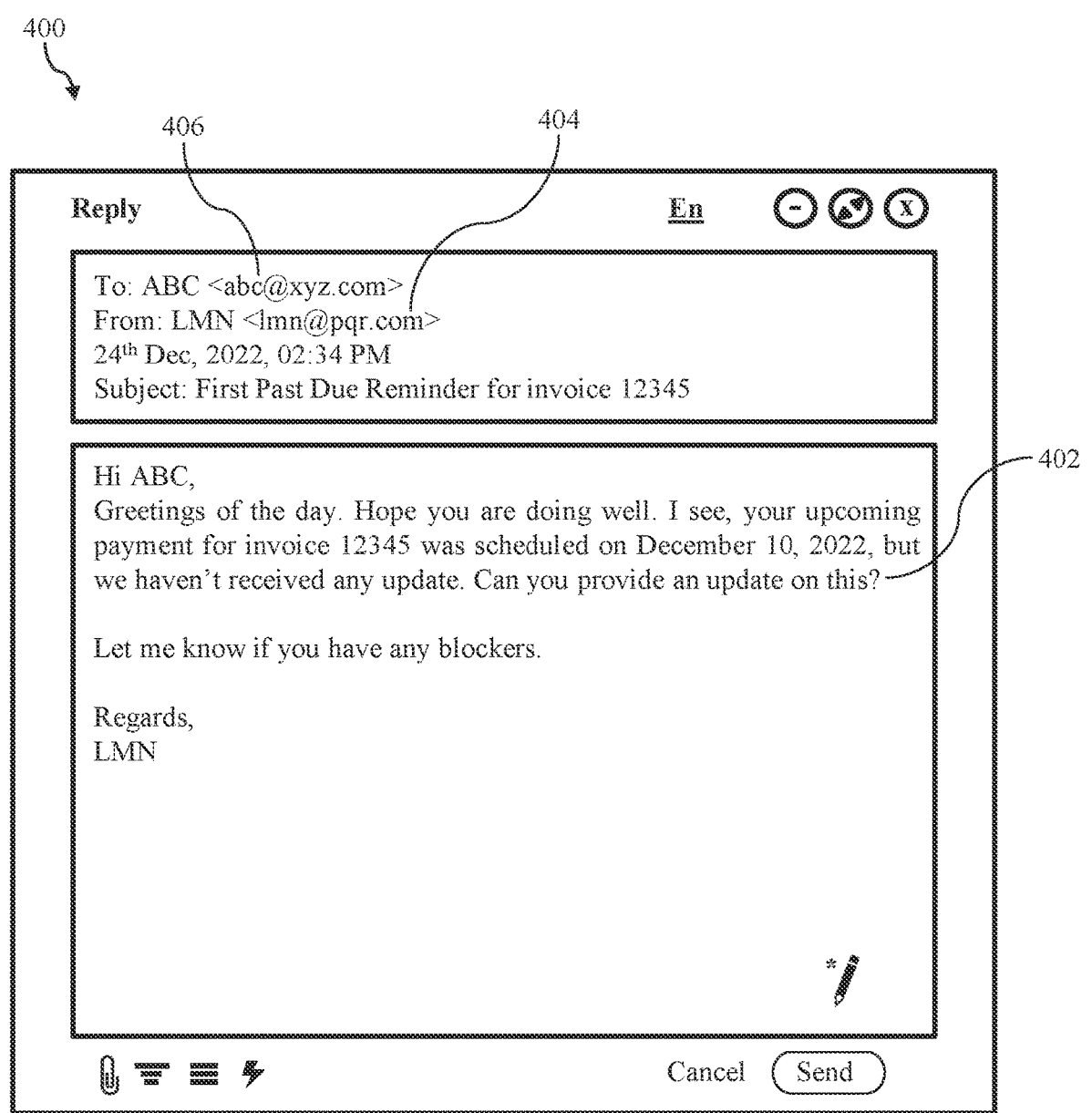
Figure 4B:
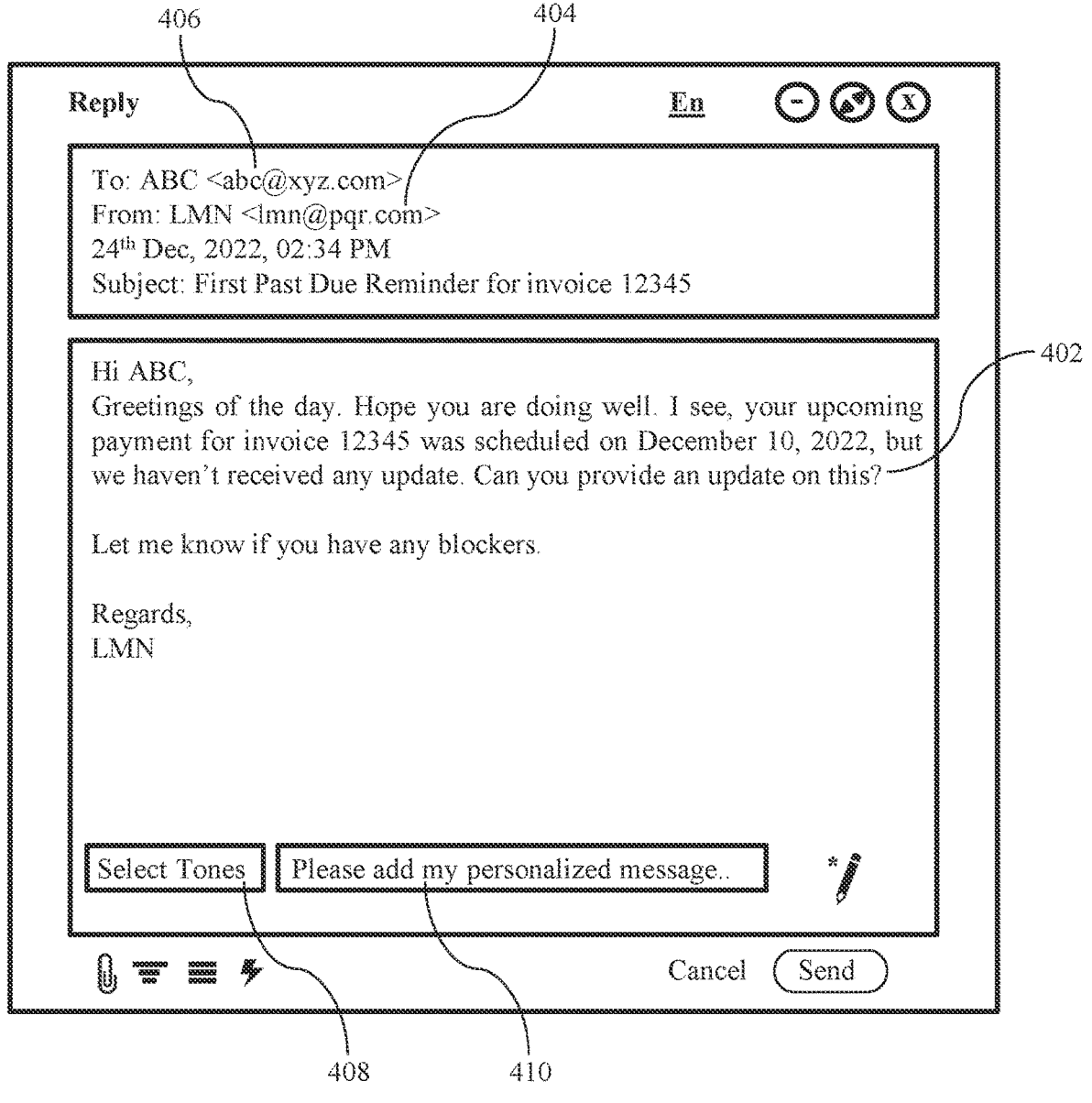

FIG. 4A-4E are exemplary user interface representations 400 of an output of the ML-based computing system 104 for generating the one or more electronic mails, in accordance with an embodiment of the present disclosure. The exemplary user interface representation in FIG. 4A shows that the electronic mail generation subsystem 218 is configured to generate the one or more electronic mails 402 (e.g., the new electronic mail or the response to the customer's electronic mail) and the generated one or more electronic mails are reviewed and then transmitted from the one or more first users 404 to the one or more second users 406 through the user interface view of the one or more first electronic devices 102. The exemplary user interface representation in FIG. 4B shows that the data receiving subsystem 210 is configured to allow the one or more first users 404 to select the one or more augmented prompts (e.g., one or more tones, intent categories and the like) 408 and the input the one or more personalized messages 410 along with the one or more electronic mails 402 to be generated and transmitted to the one or more second users 406.

Figure 4C:
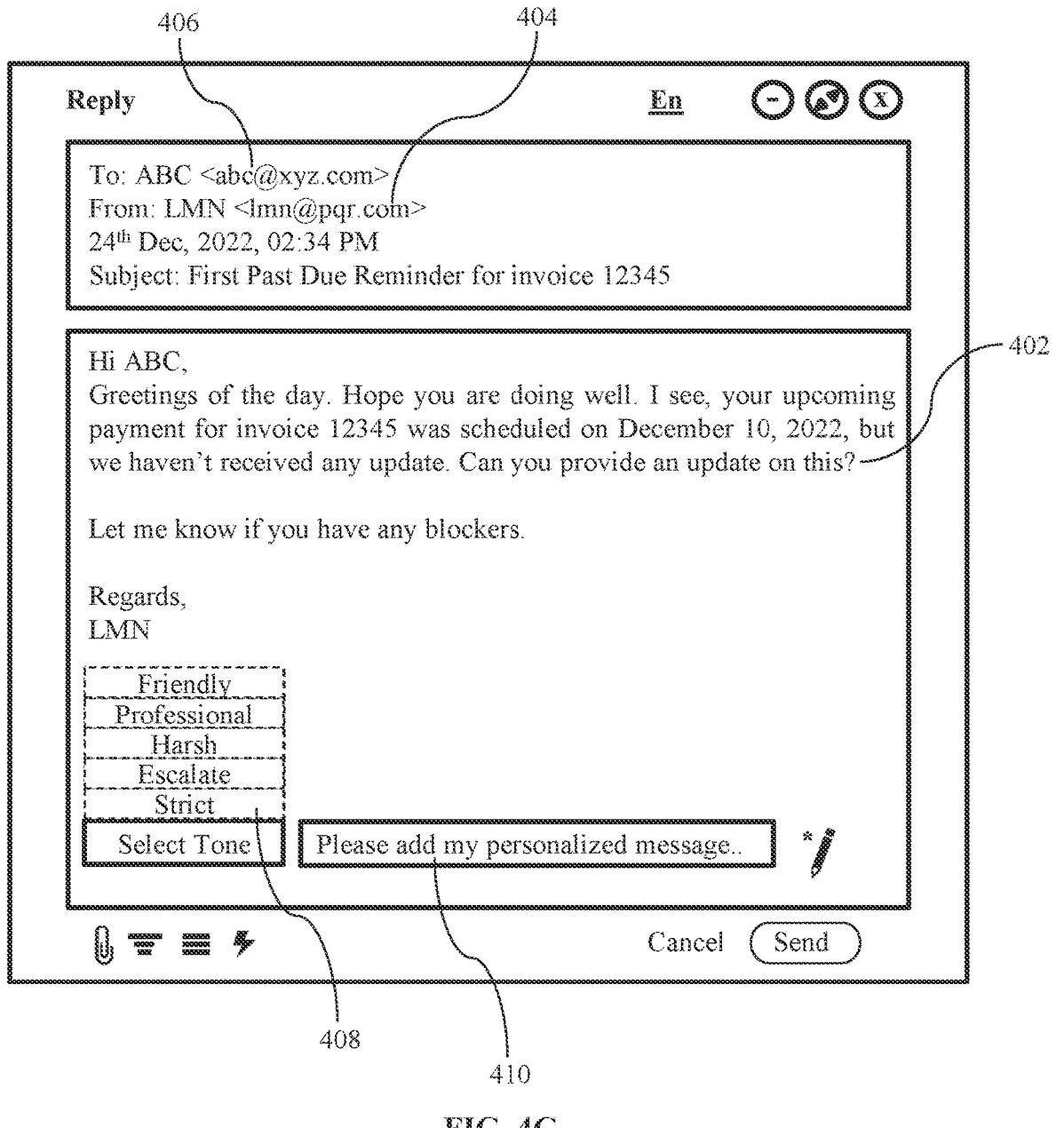
Figure 4D:
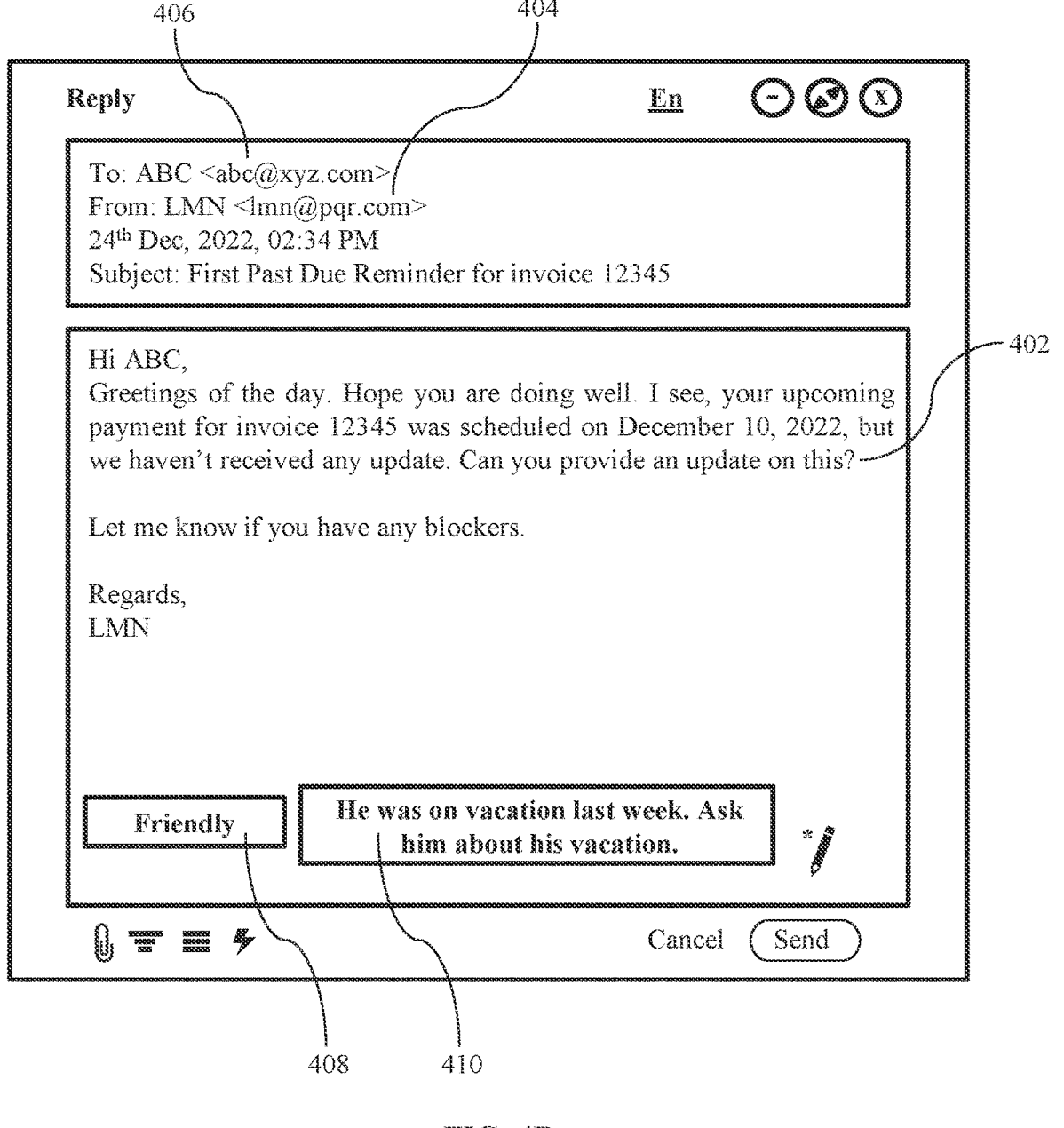

The exemplary user interface representation in FIG. 4C shows that the augmented prompts generation subsystem 216 is configured to generate the one or more augmented prompts including, but are not limited to, "strict," "escalate," "harsh," "professional," and "friendly" for enhancing the effectiveness of the one or more electronic mails 402 based on the relationship with the one or more second users (e.g., the recipients) 406 and the intended purpose of the one or more electronic mails. The exemplary user interface representation in FIG. 4D shows that the augmented prompts generation subsystem 216 is configured to allow the one or more first users 404 to specify "he was on vacation last week. Ask him about the vacation" content along with the one or more electronic mails 402 to be generated. The augmented prompts generation subsystem 216 is further configured to generate the corresponding electronic mail text along with the one or more tones 408 during sending the one or more electronic mails 402 to the one or more second users 406, as shown in FIG. 4E.

FIG. 5 is a flow chart illustrating a machine-learning based (ML-based) computing method 500 for generating the one or more electronic mails, in accordance with an embodiment of the present disclosure.

At step 502, the one or more inputs are received from the one or more first electronic devices 102 associated with the one or more first users. In an embodiment, the one or more inputs include at least one of: the first input to generate the one or more first electronic mails for the one or more second users, the second input to generate the one or more second electronic mails in response to the one or more third electronic mails received from the one or more second electronic devices associated with the one or more second users, the third input to generate the one or more augmented prompts for at least one of: the one or more first electronic mails and the one or more second electronic mails, and the fourth input to generate the one or more messages with at least one of: the one or more first electronic mails and the one or more second electronic mails.

At step 504, the one or more data associated with the one or more second users are extracted from the one or more databases 108. At step 506, the one or more pre-defined electronic mails are retrieved from the one or more electronic mail repositories based on at least one of: the first input associated with the one or more first electronic mails to be generated and the second input associated with the one or more second electronic mails to be generated in response to the one or more third electronic mails received from the one or more second electronic devices associated with the one or more second users, by the machine learning model.

At step 508, the one or more augmented prompts are generated for at least one of: the one or more first electronic mails, and the one or more second electronic mails, based on the one or more data objects received from at least one of: the one or more inputs received from the one or more first electronic devices 102 associated with the one or more first users, the one or more data associated with the one or more second users, and the one or more pre-defined electronic mails retrieved from the one or more electronic mail repositories.

At step 510, at least one of: the one or more first electronic mails and the one or more second electronic mails, are generated by the machine learning model based on the generated one or more augmented prompts. At step 512, the output of at least one of: the generated one or more first electronic mails and the generated one or more second electronic mails, are provided to the one or more first users on the user interface associated with the one or more first electronic devices 102.

The present invention has the following advantages. The present invention with the ML-based computing system 104 is configured to automatically generate the one or more electronic mails and provide the generated one or more electronic mails to the one or more first users. The present invention with the ML-based computing system 104 is configured to generate the one or more electronic mails for an electronic mail management process within the realm of accounts receivables. The machine learning based computing system 104 and the machine learning based computing method 500 help to save time and resources for the accounts receivables department, and also improves the usage of computing resources.

The present invention with the ML-based computing system 104 is configured to attach the one or more documents retrieved by the data extraction subsystem 212 that are relevant to the one or more electronic mails automatically. This process saves time and effort for the one or more first users (e.g., the collection analyst), who do not have to search for the one or more documents manually. In certain embodiments, the output subsystem 220 is configured to be user-friendly and easy to use. The one or more first users can easily review the electronic mail text and one or more attached documents and make any necessary changes before sending the one or more electronic mails to the one or more second users. In certain embodiments, the output subsystem 220 is also designed to be secure and confidential. The electronic mail text and the one or more attached documents are only accessible to the one or more first users (e.g., an authorized personnel), ensuring that confidential information is not leaked.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the ML-based computing system 104 either directly or through intervening I/O controllers. Network adapters may also be coupled to the ML-based computing system 104 to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/ML-based computing system 104 in accordance with the embodiments herein. The ML-based computing system 104 herein comprises at least one processor or central processing unit (CPU), The CPUs are interconnected via system bus 208 to various devices including at least one of: a random-access memory (RAM), read-only memory (ROM), and an input/output (I/O) adapter. The I/O adapter can connect to peripheral devices, including at least one of: disk units and tape drives, or other program storage devices that are readable by the ML-based computing system 104. The ML-based computing system 104 can read the inventive instructions on the program storage devices and follow these instructions to execute the methodology of the embodiments herein.

The ML-based computing system 104 further includes a user interface adapter that connects a keyboard, mouse, speaker, microphone, and/or other user interface devices including a touch screen device (not shown) to the bus to gather user input. Additionally, a communication adapter connects the bus to a data processing network, and a display adapter connects the bus to a display device which may be embodied as an output device including at least one of: a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a." "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that are issued on an application based here on. Accordingly, the embodiments of the present invention are intended to be illustrative, but not limiting, of the scope of the invention, which is set forth in the following claims.

What is claimed is:

1. A machine-learning based (ML-based) computing method for generating one or more electronic mails, the ML-based computing method comprising:

receiving, by one or more hardware processors, one or more inputs from one or more first electronic devices associated with one or more first users, wherein the one or more inputs comprise at least one of: a first input to generate one or more first electronic mails for one or more second users, a second input to generate one or more second electronic mails in response to one or more third electronic mails received from one or more second electronic devices associated with the one or more second users, a third input to generate one or more augmented prompts for at least one of: the one or more first electronic mails and the one or more second electronic mails, and a fourth input to generate one or more messages with at least one of: the one or more first electronic mails and the one or more second electronic mails;

extracting, by the one or more hardware processors, one or more data associated with the one or more second users from one or more databases;

retrieving, by the one or more hardware processors, one or more pre-defined electronic mails from one or more electronic mail repositories based on at least one of: the first input associated with the one or more first electronic mails to be generated and the second input associated with the one or more second electronic mails to be generated in response to the one or more third electronic mails received from the one or more second electronic devices associated with the one or more second users, by a machine learning model, wherein retrieving, by the machine learning model, the one or more pre-defined electronic mails from the one or more electronic mail repositories, comprises:

assigning, by the one or more hardware processors, one or more embedding scores to one or more embedding vectors comprising one or more texts in the one or more pre-defined electronic mails, wherein the one or more embedding scores are configured to compute relatedness between at least two or more texts in the one or more pre-defined electronic mails;

receiving, by the one or more hardware processors, at least one of: the first input associated with the one or more first electronic mails to be generated and the second input associated with the one or more second electronic mails to be generated in response to the one or more third electronic mails received from the one or more second electronic devices associated with the one or more second users;

mapping, by the one or more hardware processors, the first input associated with the one or more first electronic mails to be generated and the second input associated with the one or more second electronic mails to be generated in response to the one or more third electronic mails received from the one or more second electronic devices associated with the one or more second users, on the one or more texts in the one or more pre-defined electronic mails;

generating, by the one or more hardware processors, the one or more embedding scores for the one or more texts in the one or more pre-defined electronic mails based on the mapping of at least one of: the first input associated with the one or more first electronic mails to be generated and the second input associated with the one or more second electronic mails to be generated in response to the one or more third electronic mails received from the one or more second electronic devices associated with the one or more second users, on the one or more texts in the one or more pre-defined electronic mails; and retrieving, by the one or more hardware processors, the one or more pre-defined electronic mails with one or more optimum embedding scores, from the one or more electronic mail repositories;

generating, by the one or more hardware processors, the one or more augmented prompts for at least one of: the one or more first electronic mails, and the one or more second electronic mails, based on one or more data objects received from at least one of: the one or more inputs received from the one or more first electronic devices associated with the one or more first users, the one or more data associated with the one or more second users, and the one or more pre-defined electronic mails retrieved from the one or more electronic mail repositories;

generating, by the one or more hardware processors, at least one of: the one or more first electronic mails and the one or more second electronic mails by the machine learning model based on the generated one or more augmented prompts, wherein the machine learning model is a Large Language Model (LLM); and providing, by the one or more hardware processors, an output of at least one of: the generated one or more first electronic mails and the generated one or more second electronic mails, to the one or more first users on a user interface associated with the one or more first electronic devices.

2. The machine-learning based (ML-based) computing method of claim 1, wherein:

the one or more first users comprise at least one of: one or more data analysts, one or more business analysts, one or more cash analysts, one or more financial analysts, one or more collection analysts, one or more debt collectors, and one or more professionals associated with cash and collection management; and the one or more second users comprise at least one of: one or more individual customers, one or more organizations, one or more parent companies, one or more subsidiaries, one or more joint ventures, one or more partnerships, and one or more legal entities.

3. The machine-learning based (ML-based) computing method of claim 1, wherein extracting, by the one or more hardware processors, the one or more data associated with the one or more second users from the one or more databases, comprises:

retrieving, by the one or more hardware processors, one or more documents corresponding to at least one of: the one or more first electronic mails and the one or more second electronic mails, from the one or more databases; and retrieving, by the one or more hardware processors, one or more parameters from the one or more databases for generating the one or more augmented prompts, wherein the one or more parameters comprise at least one of: whether one or more electronic mail queries are unresolved, an acknowledgement status of the one or more electronic mails sent to the one or more second users, one or more upcoming payment reminders, one or more upcoming auto correspondences, bouncing of a last sent electronic mail and a pending action associated with the bounced last sent electronic mail, one or more contexts of unread electronic mail from the one or more second users, read and unread of the one or more electronic mails, one or more open invoices, one or more actions taken on respective invoices, credit information, one or more unapplied payments, one or more upcoming calls with the one or more second users, a last note by the one or more first users, and invoice notes.

4. The machine-learning based (ML-based) computing method of claim 1, wherein the one or more electronic mail repositories comprise at least one of: the one or more first electronic mails sent by the one or more first users and the one or more second electronic mails generated in response to the one or more third electronic mails received from the one or more second electronic devices associated with the one or more second users.

5. The machine-learning based (ML-based) computing method of claim 1, further comprising:

determining, by the one or more hardware processors, whether the one or more texts are longer than a predetermined length of a token set by the machine learning model;

segmenting, by the one or more hardware processors, the one or more texts into one or more chunks within the predetermined length of the token, wherein the one or more texts are split based on at least one of: paragraph boundaries and sentence boundaries to maintain meaning of the one or more texts;

receiving, by the one or more hardware processors, the one or more chunks at the machine learning model to generate the one or more embedding scores for the one or more chunks; and generating, by the one or more hardware processors, one or more sequences of the one or more embedding vectors associated with the one or more texts when one or more sentences are embedded.

6. The machine-learning based (ML-based) computing method of claim 1, wherein generating, by the one or more hardware processors, the one or more augmented prompts for at least one of: the one or more first electronic mails, and the one or more second electronic mails, comprises:

retrieving, by the one or more hardware processors, one or more intent categories of the one or more electronic mails comprising at least one of: the one or more first electronic mails and the one or more second electronic mails, wherein the one or more intent categories comprise at least one of: procure to pay, dispute, follow-up, account statement request, invoice request, payment confirmation, query, and miscellaneous;

providing, by the one or more hardware processors, one or more information associated with the one or more intent categories of the one or more electronic mails, to the machine learning model; and generating, by the one or more hardware processors, the one or more augmented prompts for at least one of: the one or more first electronic mails, and the one or more second electronic mails, by analyzing the one or more intent categories of the one or more electronic mails comprising at least one of: the one or more first electronic mails and the one or more second electronic mails.

7. The machine-learning based (ML-based) computing method of claim 1, further comprising re-training, by the one or more hardware processors, the machine learning model over a plurality of time intervals, wherein re-training the machine learning model over the plurality of time intervals, comprises:

receiving, by the one or more hardware processors, the one or more training data associated with the one or more second users, from an output subsystem;

adding, by the one or more hardware processors, the one or more training data with one or more original training datasets to generate one or more updated training datasets;

re-training, by the one or more hardware processors, the machine learning model, to adjust one or more configurations of an augmented prompts generation subsystem; and executing, by the one or more hardware processors, the re-trained machine learning model in the augmented prompts generation subsystem to generate one or more updated augmented prompts.

8. The machine-learning based (ML-based) computing method of claim 1, wherein the machine learning model is configured on one or more servers for generating at least one of: the one or more first electronic mails and the one or more second electronic mails, based on the generated one or more augmented prompts.

9. A machine learning based (ML-based) computing system for generating one or more electronic mails, the ML-based computing system comprising:

one or more hardware processors;

a memory coupled to the one or more hardware processors, wherein the memory comprises a plurality of subsystems in form of programmable instructions executable by the one or more hardware processors, and wherein the plurality of subsystems comprises:

a data receiving subsystem configured to receive one or more inputs from one or more first electronic devices associated with one or more first users, wherein the one or more inputs comprise at least one of: a first input to generate one or more first electronic mails for one or more second users, a second input to generate one or more second electronic mails in response to one or more third electronic mails received from one or more second electronic devices associated with the one or more second users, a third input to generate one or more augmented prompts for at least one of: the one or more first electronic mails and the one or more second electronic mails, and a fourth input to generate one or more messages with at least one of: the one or more first electronic mails and the one or more second electronic mails;

a data extraction subsystem configured to extract one or more data associated with the one or more second users from one or more databases;

an electronic mail retrieval subsystem configured to retrieve one or more pre-defined electronic mails from one or more electronic mail repositories based on at least one of: the first input associated with the one or more first electronic mails to be generated and the second input associated with the one or more second electronic mails to be generated in response to the one or more third electronic mails received from the one or more second electronic devices associated with the one or more second users, by a machine learning model, wherein in retrieving the one or more pre-defined electronic mails from the one or more electronic mail repositories, the electronic mail retrieval subsystem is configured to:

assign one or more embedding scores to one or more embedding vectors comprising one or more texts in the one or more pre-defined electronic mails, wherein the one or more embedding scores are configured to compute relatedness between at least two or more texts in the one or more pre-defined electronic mails;

receive at least one of: the first input associated with the one or more first electronic mails to be generated and the second input associated with the one or more second electronic mails to be generated in response to the one or more third electronic mails received from the one or more second electronic devices associated with the one or more second users;

map the first input associated with the one or more first electronic mails to be generated and the second input associated with the one or more second electronic mails to be generated in response to the one or more third electronic mails received from the one or more second electronic devices associated with the one or more second users, on the one or more texts in the one or more pre-defined electronic mails;

generate the one or more embedding scores for the one or more texts in the one or more pre-defined electronic mails based on the mapping of at least one of: the first input associated with the one or more first electronic mails to be generated and the second input associated with the one or more second electronic mails to be generated in response to the one or more third electronic mails received from the one or more second electronic devices associated with the one or more second users, on the one or more texts in the one or more pre-defined electronic mails; and retrieve the one or more pre-defined electronic mails with one or more optimum embedding scores, from the one or more electronic mail repositories;

an augmented prompts generation subsystem configured to generate the one or more augmented prompts for at least one of: the one or more first electronic mails, and the one or more second electronic mails, based on one or more data objects received from at least one of: the one or more inputs received from the one or more first electronic devices associated with the one or more first users, the one or more data associated with the one or more second users, and the one or more pre-defined electronic mails retrieved from the one or more electronic mail repositories;

an electronic mail generation subsystem configured to generate at least one of: the one or more first electronic mails and the one or more second electronic mails by the machine learning model based on the generated one or more augmented prompts, wherein the machine learning model is a Large Language Model (LLM); and an output subsystem configured to provide an output of at least one of: the generated one or more first electronic mails and the generated one or more second electronic mails, to the one or more first users on a user interface associated with the one or more first electronic devices.

10. The machine-learning based (ML-based) computing system of claim 9, wherein:

the one or more first users comprise at least one of: one or more data analysts, one or more business analysts, one or more cash analysts, one or more financial analysts, one or more collection analysts, one or more debt collectors, and one or more professionals associated with cash and collection management; and the one or more second users comprise at least one of: one or more individual customers, one or more organizations, one or more parent companies, one or more subsidiaries, one or more joint ventures, one or more partnerships, and one or more legal entities.

11. The machine-learning based (ML-based) computing system of claim 9, wherein in extracting the one or more data associated with the one or more second users from the one or more databases, the data extraction subsystem is configured to:

retrieve one or more documents corresponding to at least one of: the one or more first electronic mails and the one or more second electronic mails, from the one or more databases; and retrieve one or more parameters from the one or more databases for generating the one or more augmented prompts, wherein the one or more parameters comprise at least one of: whether one or more electronic mail queries are unresolved, an acknowledgement status of the one or more electronic mails sent to the one or more second users, one or more upcoming payment reminders, one or more upcoming auto correspondences, bouncing of a last sent electronic mail and a pending action associated with the bounced last sent electronic mail, one or more contexts of unread electronic mail from the one or more second users, read and unread of the one or more electronic mails, one or more open invoices, one or more actions taken on respective invoices, credit information, one or more unapplied payments, one or more upcoming calls with the one or more second users, a last note by the one or more first users, and invoice notes.

12. The machine-learning based (ML-based) computing system of claim 9, wherein the one or more electronic mail repositories comprise at least one of: the one or more first electronic mails sent by the one or more first users and the one or more second electronic mails generated in response to the one or more third electronic mails received from the one or more second electronic devices associated with the one or more second users.

13. The machine-learning based (ML-based) computing system of claim 9, wherein the electronic mail retrieval subsystem is further configured to:

determine whether the one or more texts are longer than a predetermined length of a token set by the machine learning model;

segment the one or more texts into one or more chunks within the predetermined length of the token, wherein the one or more texts are split based on at least one of: paragraph boundaries and sentence boundaries to maintain meaning of the one or more texts;

receive the one or more chunks at the machine learning model to generate the one or more embedding scores for the one or more chunks; and generate one or more sequences of the one or more embedding vectors associated with the one or more texts when one or more sentences are embedded.

14. The machine-learning based (ML-based) computing method of claim 9, wherein in generating the one or more augmented prompts for at least one of: the one or more first electronic mails, and the one or more second electronic mails, the augmented prompts generation subsystem is configured to:

retrieve one or more intent categories of the one or more electronic mails comprising at least one of: the one or more first electronic mails and the one or more second electronic mails, wherein the one or more intent categories comprise at least one of: procure to pay, dispute, follow-up, account statement request, invoice request, payment confirmation, query, and miscellaneous;

provide one or more information associated with the one or more intent categories of the one or more electronic mails, to the machine learning model; and generate the one or more augmented prompts for at least one of: the one or more first electronic mails, and the one or more second electronic mails, by analyzing the one or more intent categories of the one or more electronic mails comprising at least one of: the one or more first electronic mails and the one or more second electronic mails.

15. The machine-learning based (ML-based) computing system of claim 9, further comprising a retraining subsystem configured to re-train the machine learning model over a plurality of time intervals, wherein in re-training the machine learning model over a plurality of time intervals, the retraining subsystem is configured to:

receive the one or more training data associated with the one or more second users, from the output subsystem;

add the one or more training data with one or more original training datasets to generate one or more updated training datasets;

re-train the machine learning model to adjust one or more configurations of the augmented prompts generation subsystem; and execute the re-trained machine learning model in the augmented prompts generation subsystem to generate one or more updated augmented prompts.

16. The machine-learning based (ML-based) computing system of claim 9, wherein the machine learning model is configured on one or more servers for generating at least one of: the one or more first electronic mails and the one or more second electronic mails, based on the generated one or more augmented prompts.

17. A non-transitory computer-readable storage medium having instructions stored therein that when executed by a hardware processor, cause the processor to execute operations of:

receiving one or more inputs from one or more first electronic devices associated with one or more first users, wherein the one or more inputs comprise at least one of: a first input to generate one or more first electronic mails for one or more second users, a second input to generate one or more second electronic mails in response to one or more third electronic mails received from one or more second electronic devices associated with the one or more second users, a third input to generate one or more augmented prompts for at least one of: the one or more first electronic mails and the one or more second electronic mails, and a fourth input to generate one or more messages with at least one of: the one or more first electronic mails and the one or more second electronic mails;

extracting one or more data associated with the one or more second users from one or more databases;

retrieving one or more pre-defined electronic mails from one or more electronic mail repositories based on at least one of: the first input associated with the one or more first electronic mails to be generated and the second input associated with the one or more second electronic mails to be generated in response to the one or more third electronic mails received from the one or more second electronic devices associated with the one or more second users, by a machine learning model, wherein retrieving, by the machine learning model, the one or more pre-defined electronic mails from the one or more electronic mail repositories, comprises:

assigning one or more embedding scores to one or more embedding vectors comprising one or more texts in the one or more pre-defined electronic mails, wherein the one or more embedding scores are configured to compute relatedness between at least two or more texts in the one or more pre-defined electronic mails;

receiving at least one of: the first input associated with the one or more first electronic mails to be generated and the second input associated with the one or more second electronic mails to be generated in response to the one or more third electronic mails received from the one or more second electronic devices associated with the one or more second users, from the one or more first users;

mapping the first input associated with the one or more first electronic mails to be generated and the second input associated with the one or more second electronic mails to be generated in response to the one or more third electronic mails received from the one or more second electronic devices associated with the one or more second users, on the one or more texts in the one or more pre-defined electronic mails;

generating the one or more embedding scores for the one or more texts in the one or more pre-defined electronic mails based on the mapping of at least one of: the first input associated with the one or more first electronic mails to be generated and the second input associated with the one or more second electronic mails to be generated in response to the one or more third electronic mails received from the one or more second electronic devices associated with the one or more second users, on the one or more texts in the one or more pre- defined electronic mails; and retrieving the one or more pre-defined electronic mails with one or more optimum embedding scores, from the one or more electronic mail repositories;

generating the one or more augmented prompts for at least one of: the one or more first electronic mails, and the one or more second electronic mails, based on one or more data objects received from at least one of: the one or more inputs received from the one or more first electronic devices associated with the one or more first users, the one or more data associated with the one or more second users, and the one or more pre-defined electronic mails retrieved from the one or more electronic mail repositories;

generating at least one of: the one or more first electronic mails and the one or more second electronic mails by the machine learning model based on the generated one or more augmented prompts, wherein the machine learning model is a Large Language Model (LLM); and providing an output of at least one of: the generated one or more first electronic mails and the generated one or more second electronic mails, to the one or more first users on a user interface associated with the one or more first electronic devices.

18. The non-transitory computer-readable storage medium of claim 17, wherein the one or more electronic mail repositories comprise at least one of:

the one or more first electronic mails sent by the one or more first users and the one or more second electronic mails generated in response to the one or more third electronic mails received from the one or more second electronic devices associated with the one or more second users.

19. The non-transitory computer-readable storage medium of claim 17, further comprising:

determining whether the one or more texts are longer than a predetermined length of a token set by the machine learning model;

segmenting the one or more texts into one or more chunks within the predetermined length of the token, wherein the one or more texts are split based on at least one of: paragraph boundaries and sentence boundaries to maintain meaning of the one or more texts;

receiving the one or more chunks at the machine learning model to generate the one or more embedding scores for the one or more chunks; and generating one or more sequences of the one or more embedding vectors associated with the one or more texts when one or more sentences are embedded.

20. The non-transitory computer-readable storage medium of claim 17, wherein generating the one or more augmented prompts for at least one of: the one or more first electronic mails, and the one or more second electronic mails, comprises:

retrieving one or more intent category of the one or more electronic mails comprising at least one of: the one or more first electronic mails and the one or more second electronic mails based on information associated with one or more contexts of the one or more augmented prompts;

providing one or more information associated with the one or more intent category of the one or more electronic mails, to the machine learning model; and generating the one or more augmented prompts for at least one of: the one or more first electronic mails, and the one or more second electronic mails, by analyzing the one or more intent category of the one or more electronic mails comprising at least one of: the one or more first electronic mails and the one or more second electronic mails.

* * * * *